(12) United States Patent
Gay et al.

(10) Patent No.: US 10,044,832 B2
(45) Date of Patent: Aug. 7, 2018

(54) DATA REQUEST MULTIPLEXING

(71) Applicant: Home Box Office, Inc., New York, NY (US)

(72) Inventors: Allen Arthur Gay, Shoreline, WA (US); Sata Busayarat, Seattle, WA (US)

(73) Assignee: HOME BOX OFFICE, INC., New York, NY (US)

( * ) Notice: Subject to any disclaimer, the term of this patent is extended or adjusted under 35 U.S.C. 154(b) by 112 days.

(21) Appl. No.: 15/252,166

(22) Filed: Aug. 30, 2016

(65) Prior Publication Data

US 2018/0063280 A1    Mar. 1, 2018

(51) Int. Cl.
*G06F 15/167*      (2006.01)
*H04L 29/08*       (2006.01)

(52) U.S. Cl.
CPC .............. *H04L 67/32* (2013.01); *H04L 67/10* (2013.01); *H04L 67/2842* (2013.01)

(58) Field of Classification Search
USPC ....... 709/203, 213, 217, 219, 223, 224, 226, 709/228, 231, 232, 238; 707/737; 714/13; 455/519
See application file for complete search history.

(56) References Cited

U.S. PATENT DOCUMENTS

| | | | |
|---|---|---|---|
| 6,025,837 A | 2/2000 | Matthews, III et al. | |
| 7,620,653 B1 | 11/2009 | Swartz | |
| 8,849,825 B1 * | 9/2014 | McHugh | G06F 17/3033 |
| | | | 707/737 |
| 9,031,995 B1 | 5/2015 | Raden, II et al. | |
| 9,875,262 B2 * | 1/2018 | McHugh | G06F 17/30309 |
| 9,887,885 B2 | 2/2018 | Varney et al. | |
| 9,891,938 B2 * | 2/2018 | Barry | G06F 9/4555 |
| 2001/0034771 A1 | 10/2001 | Hutsch et al. | |
| 2002/0143591 A1 | 10/2002 | Connelly | |

(Continued)

FOREIGN PATENT DOCUMENTS

| | | |
|---|---|---|
| EP | 0848554 A2 | 6/1998 |
| WO | 9713368 A1 | 4/1997 |

(Continued)

OTHER PUBLICATIONS

International Search Report and Written Opinion for PCT Application Serial No. PCT/US2016/056755 dated Dec. 19, 2016, 15 pages.

(Continued)

*Primary Examiner* — Quang N Nguyen
(74) *Attorney, Agent, or Firm* — Amin, Turocy & Watson, LLP

(57) ABSTRACT

The described technology is generally directed towards combining (multiplexing) two or more pending data requests for the same data item into a single request that is sent to a data providing entity such as a back-end data service. Described is maintaining a mapping of the requests to requesting entities so that a single response to a multiplexed request having data for a requested data item may be re-associated (de-multiplexed) to each requesting entity that requested that data item. Also described is batching a plurality of requests, which may include one or more multiplexed requests, into a batch request sent to a data providing entity.

14 Claims, 18 Drawing Sheets

(56) References Cited

U.S. PATENT DOCUMENTS

| | | |
|---|---|---|
| 2004/0082352 A1* | 4/2004 | Keating .................. H04W 4/08 |
| | | 455/519 |
| 2004/0139480 A1 | 7/2004 | Delpuch et al. |
| 2010/0063878 A1 | 3/2010 | Bachet et al. |
| 2011/0246471 A1 | 10/2011 | Rakib |
| 2011/0289458 A1 | 11/2011 | Yu et al. |
| 2011/0289533 A1 | 11/2011 | White et al. |
| 2013/0031204 A1 | 1/2013 | Graham et al. |
| 2013/0046849 A1 | 2/2013 | Wolf et al. |
| 2013/0346539 A1 | 12/2013 | Sivasubramanian et al. |
| 2014/0006951 A1 | 1/2014 | Hunter |
| 2014/0040301 A1 | 2/2014 | Chadha et al. |
| 2014/0181137 A1 | 6/2014 | Stein |
| 2014/0223303 A1 | 8/2014 | Cox et al. |
| 2016/0105710 A1 | 4/2016 | Watson et al. |
| 2016/0140002 A1* | 5/2016 | Fee ..................... G06F 11/1064 |
| | | 714/13 |
| 2016/0337426 A1 | 11/2016 | Shribman et al. |
| 2017/0032005 A1* | 2/2017 | Zheng ............... G06F 17/30088 |

FOREIGN PATENT DOCUMENTS

| | | |
|---|---|---|
| WO | 2007054687 A1 | 5/2007 |
| WO | 2011102824 A2 | 8/2011 |

OTHER PUBLICATIONS

Office Action for U.S. Appl. No. 15/285,439 dated Jul. 27, 2017, 27 pages.

Office Action for U.S. Appl. No. 15/285,439 dated Feb. 2, 2018, 23 pages.

El-Ansary, et al., "An Overview of Structured P2P Overlay Networks," In: Handbook on Theoretical and Algorithmic Aspects of Sensor, Ad Hoc Wireless, and Peer-to-Peer Networks 1 led] Jie Wu, Auerbach Publications, 2006, 27 pages.

Office Action for U.S. Appl. No. 15/291,247 dated Jun. 14, 2018, 43 pages.

\* cited by examiner

DATA REQUEST MULTIPLEXING

BACKGROUND

When handling large numbers of requests from requesting entities such as clients, data services need to provide enough capacity to handle peak demands. One way that the capacity is typically increased is by caching data in relatively fast memory so that servers often need not access the underlying physical data sources (e.g., data stores and/or other databases) to respond to requests.

Caching has its limitations, however, including that cache misses can often occur. Thus, data requests that result in cache misses need to be handled below the data caching level, by sending the request down to the underlying (e.g., physical) data store level. Further, cached data is associated with an expiration (e.g., timestamp or time-to-live, or TTL) value, and thus expire, whereby requests for data that are expired in a cache similarly need to be handled below the data caching level.

When there is a spike in the number of demands, the data service may fail to keep up. To avoid failing, a typical solution is to add capacity at a level below the caching level, e.g., add larger and/or more data stores/databases operating in parallel. However, adding such additional capacity is expensive.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, the technology described herein is generally directed towards reducing the number of data item requests to a data-providing entity by multiplexing requests for the same data item into a single request. The single response to the request may be de-multiplexed to each requestor of that data item. One or more aspects are directed towards receiving a first and second requests for data associated with a first data identifier from first and second requesting entities, respectively, and maintaining mapping information for that associates the first data identifier with the first requesting entity and associates the first data identifier with the second requesting entity. Upon determining that the first data identifier applies to the first request and to the second request, the data associated with the first data identifier is requested from a data-providing entity in a multiplexed request, with a response to the multiplexed request that includes the data associated with the first data identifier received from the data-providing entity. A first response to the first request and a second response to the second request that each include the requested data are returned based upon the mapping information.

Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Various aspects of the technology described herein are generally directed towards reducing the number of network data requests that need to be handled by data services, including backing data sources below the caching level. To this end, multiple requests made by requesting entities (such as client users) for the same data are multiplexed (combined) into a single request for that data. When the response returns, the response is remapped (de-multiplexed) to each requesting entity for returning to that requesting entity.

Another aspect that increases efficiency is batching requests. Instead of making a single request to a downstream data service, requests may be collected into a batch "buffer" for an amount of time, (e.g., corresponding to a video rendering frame), and then sent to a data service/backing data source. Batching in many scenarios is more efficient than sending individual requests. Note that the "buffer" may be any suitable data structure, e.g., an HTTP batch request container or the like that is built by a requesting entity and sent when ready to a request-receiving entity.

It should be understood that any of the examples herein are non-limiting. For instance, some of the examples refer to returning program-related catalog items, such as built from one or more data sources to represent television content such as movies or shows. However, the technology described herein is independent of any particular type of data being cached. Further, the technology described herein is exemplified with respect to a front-end/client facing service (a data retrieval service) and a back-end service (a back-end data service) that returns data to the front-end data service when needed; however, this is only one implementation, and a single data service that operates to respond to client requests without a separate front-end or back-end service may benefit from the technology described herein. Further, each client may also multiplex and/or batch client requests to the data service. As such, the technology described herein is not limited to any particular embodiments, aspects, concepts, structures, functionalities or examples described herein. Rather, any of the embodiments, aspects, concepts, structures, functionalities or examples described herein are non-limiting, and the technology may be used in various ways that provide benefits and advantages in computing and data retrieval in general.

Figure 1:
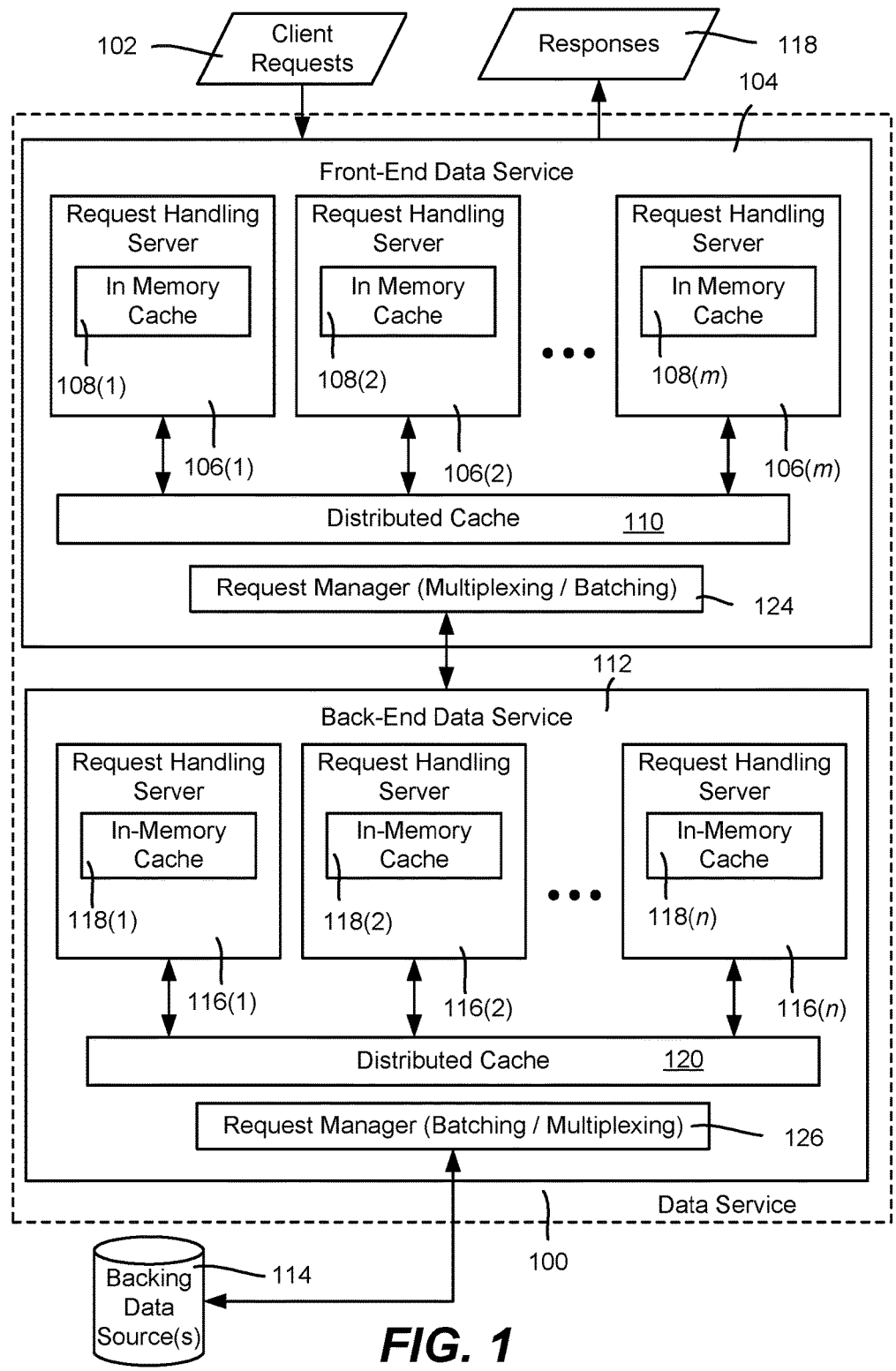
FIG. 1 is an example block diagram representation of components that handle requests for data including via request multiplexing, according to one or more example implementations.

FIG. 1 is a block diagram representing example components, including those of a data service 100, which may be used to provide and work in conjunction with multiplexed data requests as described herein. In FIG. 1, client requests 102 are received at a (e.g., front-end) data retrieval service 104 of the data service 100. One such data retrieval service 104 comprises a cluster of generally load-balanced server machines 106(1)-106(m), where m represents any practical number of server (virtual and/or physical) machines. In one or more implementations, the load-balanced server machines 106(1)-106(m) each have an in memory cache, 108(1)-108(m), respectively.

Also shown in FIG. 1 is a distributed cache 110, e.g., a REDIS cache shared among the request handling servers 106(1)-106(m). In a typical implementation, the distributed cache 110 is larger than the individual in-memory caches 108(1)-108(m) and has a higher hit rate; however the distributed cache 110 takes longer to access, e.g., needing a network request and response.

Further shown in FIG. 1 is a back-end data service 112 that is coupled to the front-end data service 104 and one or more backing data sources 114. In one or more implementations, the back-end data service 112 comprises a cluster of generally load-balanced server machines 116(1)-116(n), where n represents any practical number of such server (virtual and/or physical) machines. In one or more implementations, the load-balanced back-end data server machines 116(1)-116(m) each have an in-memory cache 118(1)-118(n), respectively. A back-end distributed cache 120 likewise is typically provided.

As described herein, even with various layers of caching, a client request sometimes results in a cache miss or a cache hit of expired data. When this occurs at the front-end server level, the front-end server level server knows that it needs to obtain and/or build the data, e.g., a data item set of one or more data items, whereby in one or more implementations the back-end data service 112 is invoked; the back-end data service 112 is the data-providing entity from the perspective of the front-end service 104. If the browse service 110 likewise does not have a fresh copy of the requested data in a cache, the browse service 110 makes requests to the backing data source(s) 116 to obtain the data.

As described herein, a request manager 124 of the data retrieval service 104 makes such requests, including via multiplexing and/or batching operations as described herein. A somewhat similar request manager 126 of the back-end data service 112 may perform similar multiplexing and/or batching operations with respect to making requests to the one or more backing data sources 114.

Figure 2:
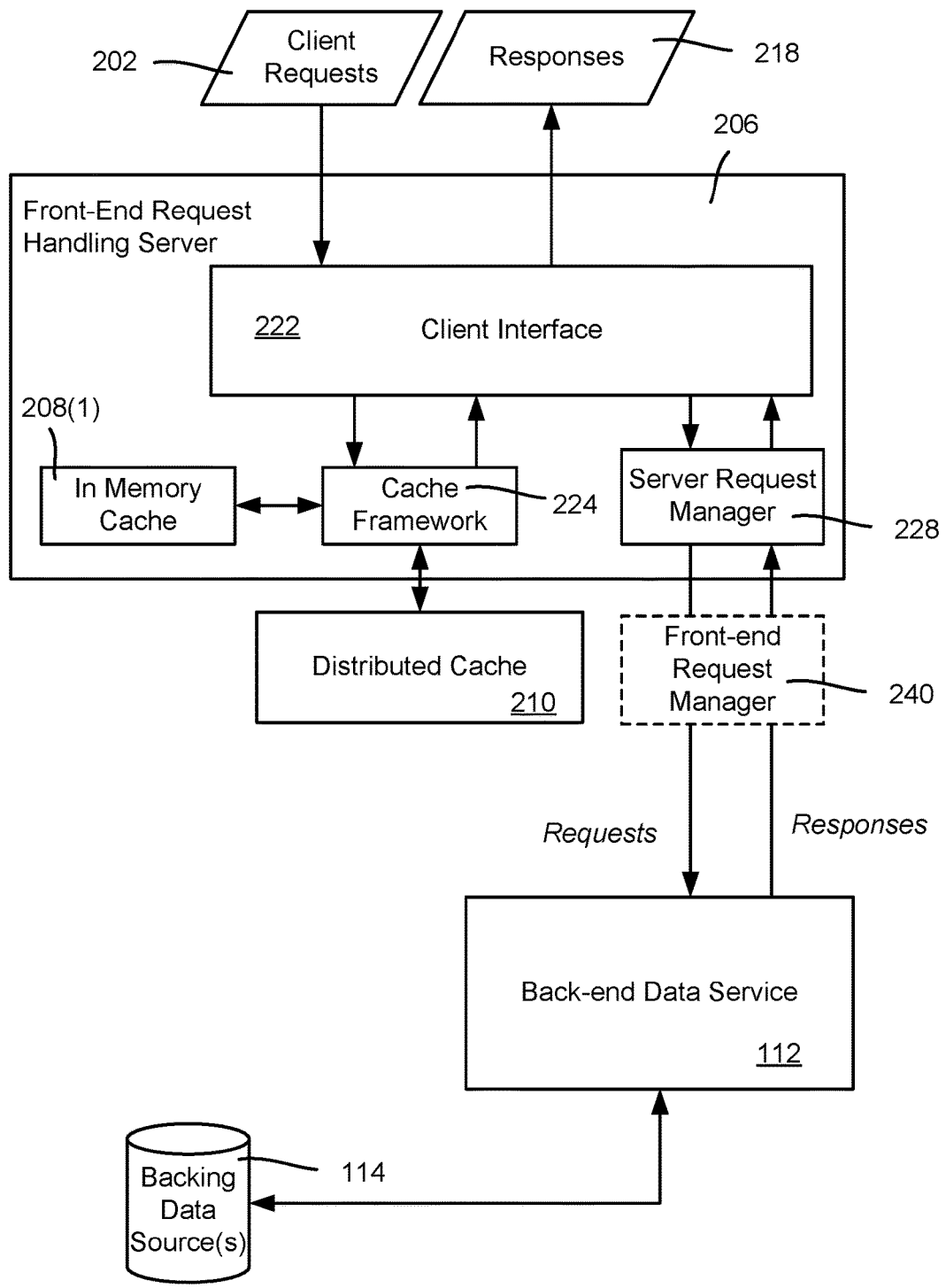
FIG. 2 is an example block diagram representation of a request handling server, e.g., a front end server, configured with a request manager to provide multiplexed, batched requests to a back-end data service (e.g., a back-end service), according to one or more example implementations.

FIG. 2 shows additional details of a client request handling front-end server 206. In one or more implementations, a client request 202 is received at a client interface 222 of the request handling server 206. For caching purposes, the exemplified implementation includes a cache framework 224 that accesses each available cache as needed in an attempt to find the requested data, starting with the lowest level cache, in-memory cache 208(1). If not found, the cache framework 224 looks to the distributed cache 210 for the data. If again not found, the cache framework 224 returns a cache miss, which indicates that the request handling server 206 needs to obtain the data from the back-end data service 112.

As described herein, the request handling server 206 may similarly request data from the back-end data service 112 when cached data is found but is expired in the in memory cache 208(1) and the distributed cache 210. Situations in which the return of cached data is not desired also results in data requests being sent to the back-end data service 112.

As also described herein, a server request manager 228 may manage the requesting of such data from the back-end data service 112 as well as the handling of responses in return. The request manager may batch requests and/or multiplex requests (e.g., sending requests for the same data only once, instead of individual requests, and then reuniting the single response thereto with each of the individual requests) to reduce traffic to and from the back-end data service 112. Note that the request manager 228 is shown as a single component, however (as in any of the drawings herein) it is understood that the represented components are only examples, and that at least some depicted components may be combined into a lesser number of components and/or other depicted components further separated into more components.

It is feasible for the front-end data service 104 to provide a shared request manager 240, e.g., to multiplex and/or batch requests from the server 206 and at least one other front-end server. Such a shared request manager 240 may be optional, e.g., implemented or not depending on the overhead/resource usage of having one (or more) versus not implementing one or more for a given system, which may depend on factors such as the total number of front-end servers, average number of requests per server to the back-end, and so on.

Still further, one or more implementations may allow a request manager to opt-out of request multiplexing operations, such as temporarily and/or with respect to any given requested data item or sub-request. By way of example, consider that a request for data item A has been pending for a relatively long time, e.g., greater than some number of milliseconds, whereby the request is determined to have a high likelihood of failure; (the time limit may be configurable and/or heuristically determined). Rather than continue to hold further requests for data item A, a new request for data item A can be sent. To this end, requestors may be configured to re-request data items that do not receive a response within a timeout time. Upon receiving a request for a data item (whether via a re-request from a timed out requestor or a different requestor), the request manager may check a timestamp or timer associated with the corresponding pending data item and if the request has been pending too long, consider the already pending request to be no longer pending. An alternative is to occasionally/periodically scan the pending set (e.g., via a separate process) and re-request any item that is pending to long, and also reset such an item's timestamp or timer for the new request.

Figure 3:
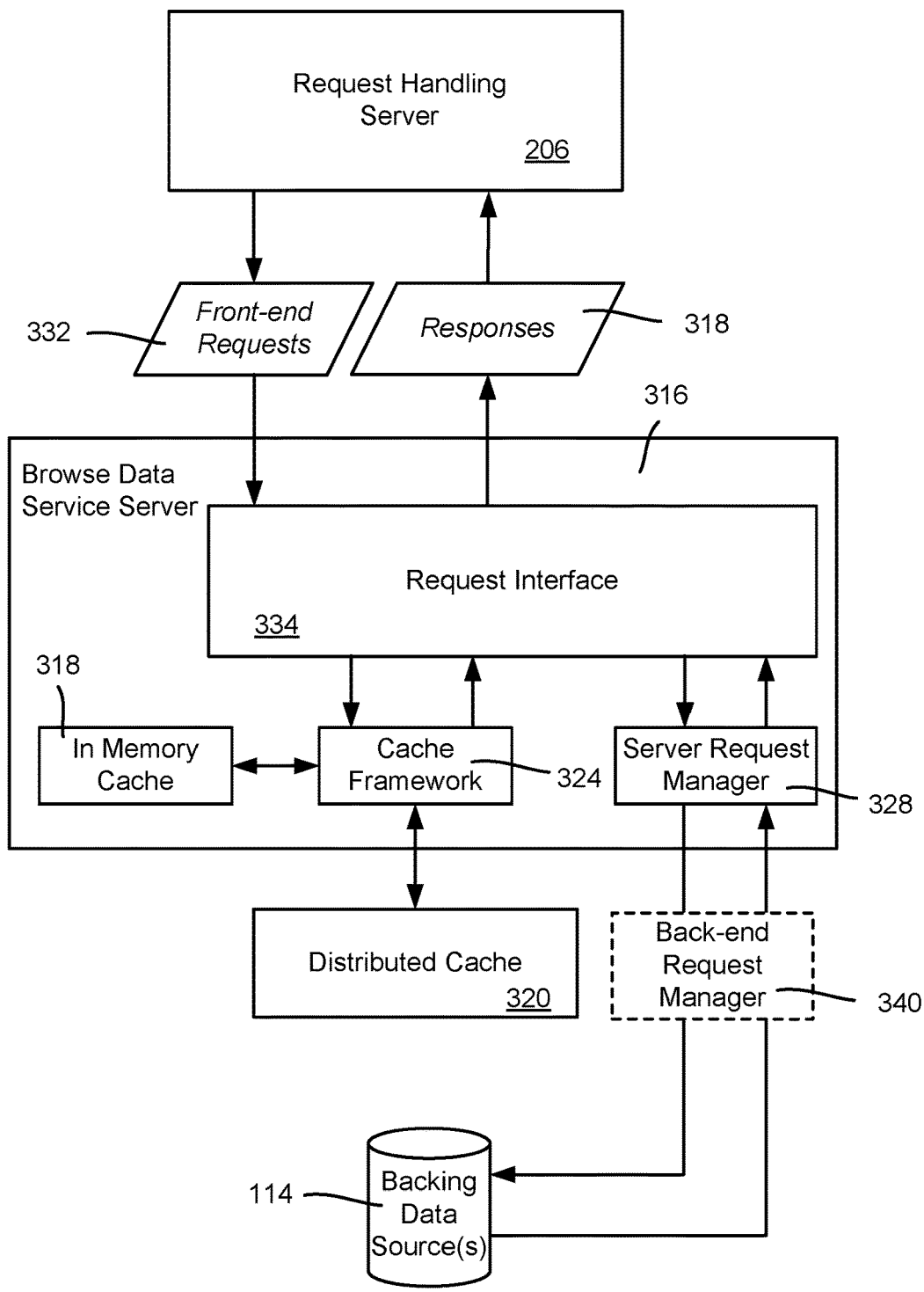
FIG. 3 is an example block diagram representation of a back-end data server (e.g., of a back-end service) configured with a request manager to provide multiplexed requests to one or more backing data sources, according to one or more example implementations.

FIG. 3 shows additional details of a back-end data service server 316 that handles back-end data requests 332 from a request handling server 206. The exemplified back-end data service server 316 is generally similar to the request handling server 206 of FIG. 2, however the exemplified cache framework 324 does not return a cache miss. Instead, if requested data is not cached in the caches 318 or 320, or is cached but expired, the cache framework 324, e.g. via a request manager 328 (and possibly a shared request manager 340), makes a call to the backing data source or sources 116 to obtain the requested data. Note that the server's request manager 328 (and if implemented the back-end request manager 340) also may batch requests and/or multiplex requests as described herein. The data is either returned from the backing data source or sources 114, or an error is returned.

Figure 4:
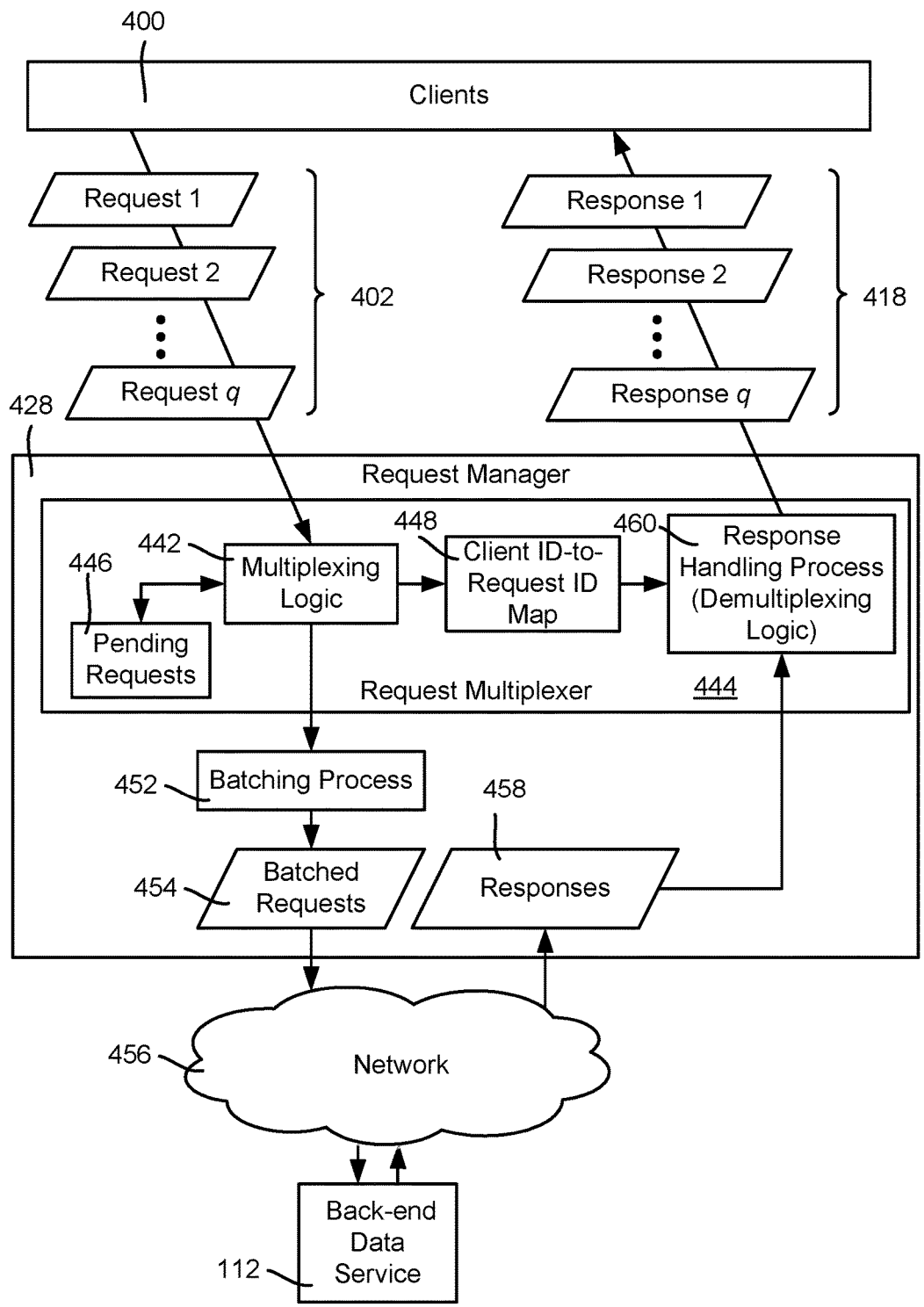
FIG. 4 is an example block diagram representation of a request manager (e.g., of a data handling server) that multiplexes and batches requests for sending to a back-end data service, according to one or more example implementations.

FIG. 4 shows additional details of an example request manager 428 at the front-end request handling server level; (most details also generally may apply to a request manager at any level). In general, requesting clients 400 make requests 402 (request 1-request q), and those requests that are not satisfied with responses from a cache at the request handling server level come in to the batch request manager 428. Each request is associated with some client identifier and requested data item identifier (e.g., a uniform resource name, or URN), whereby responses 418 (response 1-response q) are returned for each request 402 (request 1-request q) based upon which client made which request.

The request manager 428 is provided for in part for efficiency, namely to handle such requests and responses in a way that reduces the load upon the back-end data service 410. As described herein, in one or more implementations, such efficiency is obtained by batching requests and multiplexing requests, (although batching and multiplexing may operate alone, without the other being used in a given implementation).

Batching generally is directed towards adding multiple requests to a single batch request instead of making individual requests, which is generally more efficient. To this end, batching collects requests for some amount time, e.g., corresponding to a video rendering frame, and then sends a batch request when the time is reached. The number of requests in a batch may be limited, e.g., to sixteen or thirty-two, and thus to handle a larger number of requests, multiple batch requests may be sent per time window, e.g., generally at the same time, but alternatively a batch may be sent as soon as that batch is full.

Multiplexing generally refers to making a request for the same data only once, basically filtering out duplicate data requests from different requestors. As described herein, multiplexing may be done by tracking pending requests, (e.g., by data item identifier) and only making a request for the data when another request for the same data is not already pending. A pending request may be considered one that has been previously made but has not yet received a response, as well as one that has been already added to a batch buffer or the like waiting to be sent (if batching is being performed). As can be readily appreciated, because a multiplexed request results in a single response that has to be sent back to multiple, different requestors, some tracking needs to be done so that a multiplexed request may be mapped back to each of its initiating requestors.

By way of example, consider that among the many requests handled by a given request handling server, five different clients have made requests that either are in a cache miss or expired cache data condition, which causes a need to have the back-end data service 112 invoked. Thus, the batch request manager 428 multiplexes and/or batches these five requests. As part of multiplexing, the batch request manager 428 needs to have a mapping mechanism that maintains a relationship between which request corresponds to which requesting client or clients.

As a more particular example, consider that both client 1 and client 2 have requested data for some data identifier XYZ. The multiplexer detects this, and only makes a single request to the data service for the XYZ data. However, when the single response comes back with the XYZ data that satisfies the single request for XYZ, the request manager's mapping mechanism (which may be considered a "de-multiplexer") recognizes that this item applies to two different client requests, and thus that client 1 needs its own response with data XYZ, as does client 2. Two responses are thus sent, one for each request.

Thus, in FIG. 4, multiplexing logic 442 receives the requests 402, (which may include client batch requests and/or client single item requests), and for each request, maps a client identifier (ID) to the request identifier in a suitable data structure exemplified as a client ID-to-request map 448. For each request the multiplexing logic also checks a set (e.g., a list) of pending request data item IDs 446, to determine whether a request for that data item is already pending. If so, the request is not made again, otherwise the request is provided to a batching process 452.

The batching process collects such requests, and sends a set of one or more batched requests 454 to the back-end data service 410, e.g., over a suitable connection of the network 456. The back-end data service 410 returns a response for each request, shown as responses 458. A response may contain response data that satisfies its corresponding request, but may contain an error code or the like when the request cannot be satisfied.

Note that clients may send batch requests among the requests 402, which may be returned as batch responses in the responses 418 to the clients, that is, when all batched requests have received a response. However, the responses to multiplexed batched responses, shown in FIG. 4 as responses 458, may not be returned as a corresponding batch, but rather may be streamed when ready. More particularly, the responses to multiplexed and batched requests may not be batched before being returned, because waiting for a full set of responses to a batch request may delay other responses. For example, if client 1 requests A, B and C in a batch request, and that request is made in multiplexed, batch request to the back-end data service 410, and client 2 requests A and B (not sent to the back-end data service, because A and B are already pending), then there is no reason for client 2 to have to wait for request C to complete (although it was multiplexed and batched with A, B and C), as C may take a long time to complete. Notwithstanding, in alternative implementations batched responses back from the back-end data service 410 are feasible to use, and/or subsets (sub-batches) of responses to a batch may be returned therefrom. For example, a batch request for data items A, B and C may be returned as a stream of an [A, B] sub-batch response (e.g., because both are ready at the same time) followed by a [C] individual response when data item C is ready.

As described herein, a response may correspond to multiple requesting clients, and thus a response handling process 460 (basically de-multiplexing logic) uses the client ID-to-request ID map 448 to return a response for each request. Note that a response may be in the form of an error message, or may include an error message possibly along with requested data; (e.g., a response to a batch request for A, B and C may return data for A, data for B and an error for C).

Figure 5:
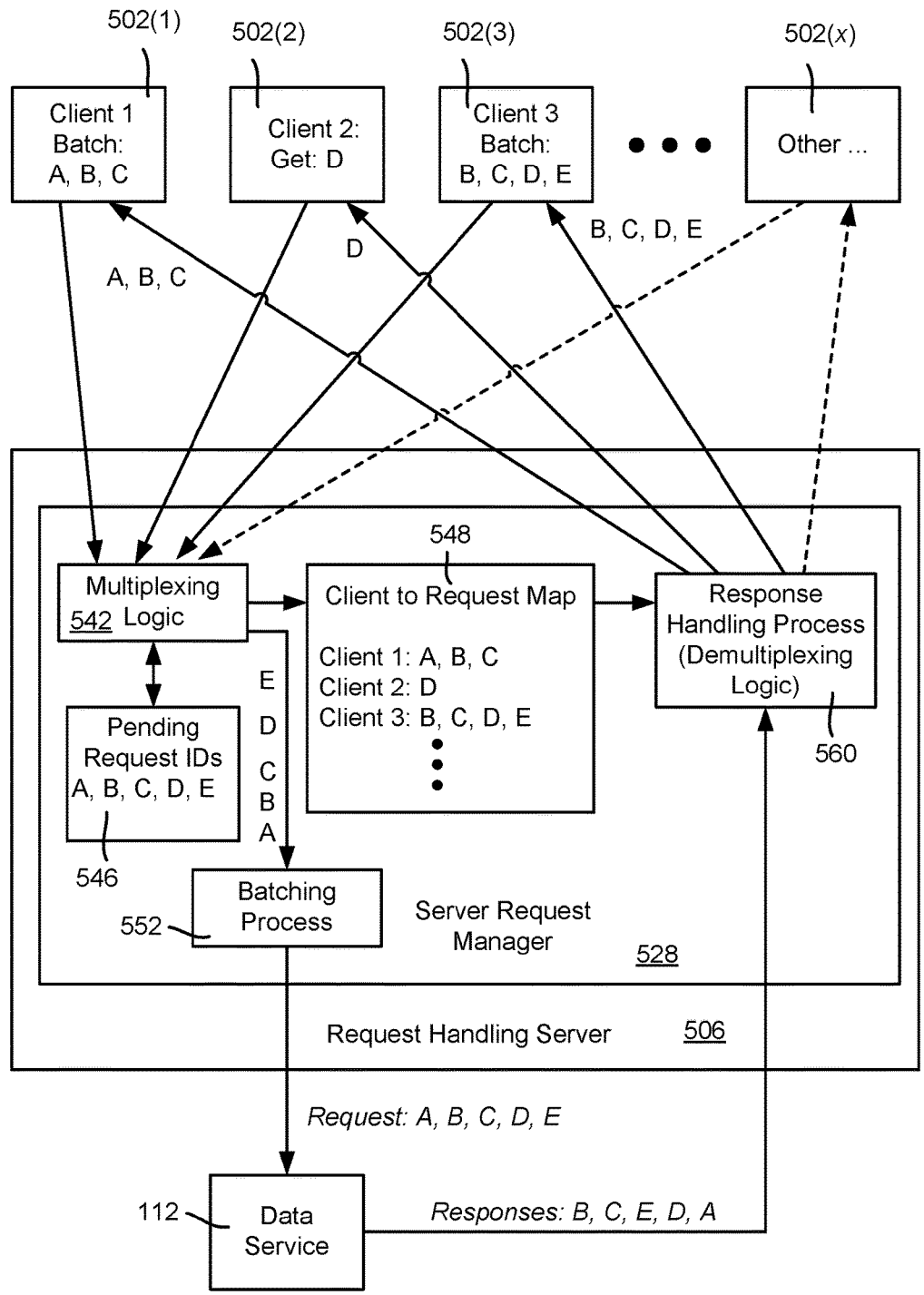
FIG. 5 is an example block and representation of a request manager (e.g., of a data handling server) showing how data requests may be multiplexed, batched and sent, with responses returned and de-multiplexed for returning, according to one or more example implementations.

FIG. 5 shows an example of a request handling server's batch request manager 528 with requests (A)-(E) made by various clients. In FIG. 5, client 502(1) makes a batch request corresponding to data request (item) IDs (A), (B) and (C), client 502(2) makes a get request corresponding to data request ID D, and client 502(3) makes a batch request corresponding to data request IDs (B), (C), (D) and (E). There may be other requests as well, represents by block 502(x), however for purposes of this example consider that only clients 502(1)-502(3) are making requests within this timeframe.

The requests 502(1), 502(2) and 502(3) come into the multiplexing logic 542 of the batch request manager 528. As the requests 502(1), 502(2) and 502(3) are received, the multiplexing logic 542 updates the client ID-to-request ID map 548. Further, duplicate requests are handled by checking the pending request ID list 546 so as to only add one instance of each request ID to the pending request ID list 546 so as to send only one single corresponding request to the batching process 552.

At an appropriate time, e.g., once per video rendering frame, the batching process 552 sends a batch request for items (A), (B), (C), (D) and (E) to the back-end data service 510. The back-end data service 510 returns data from one of its caches when cached, or attempts to obtain the data from one or more data stores if not cached. Note that as set forth herein, the responses need not be batched in this example, and may be returned in a streaming fashion in any order, e.g., responses for data items (B), (C), (E), (D) and (A) are returned in the example of FIG. 5.

Any of these requests may result in an error response rather than the actual data. If available, expired data may be returned in response to a request instead of a failure message, possibly with some indication that the data is expired.

As described herein, these responses, which were multiplexed, need to be mapped back to their requesting clients. This is performed by the response handling process 560, using the map 548 to build a response for each client. If the client made a batch request, in one or more implementations the response to that client may be batched. Alternatively, a response to a client's batch request may not be batched, but returned as received, basically in a stream of per-client responses.

Figure 6:
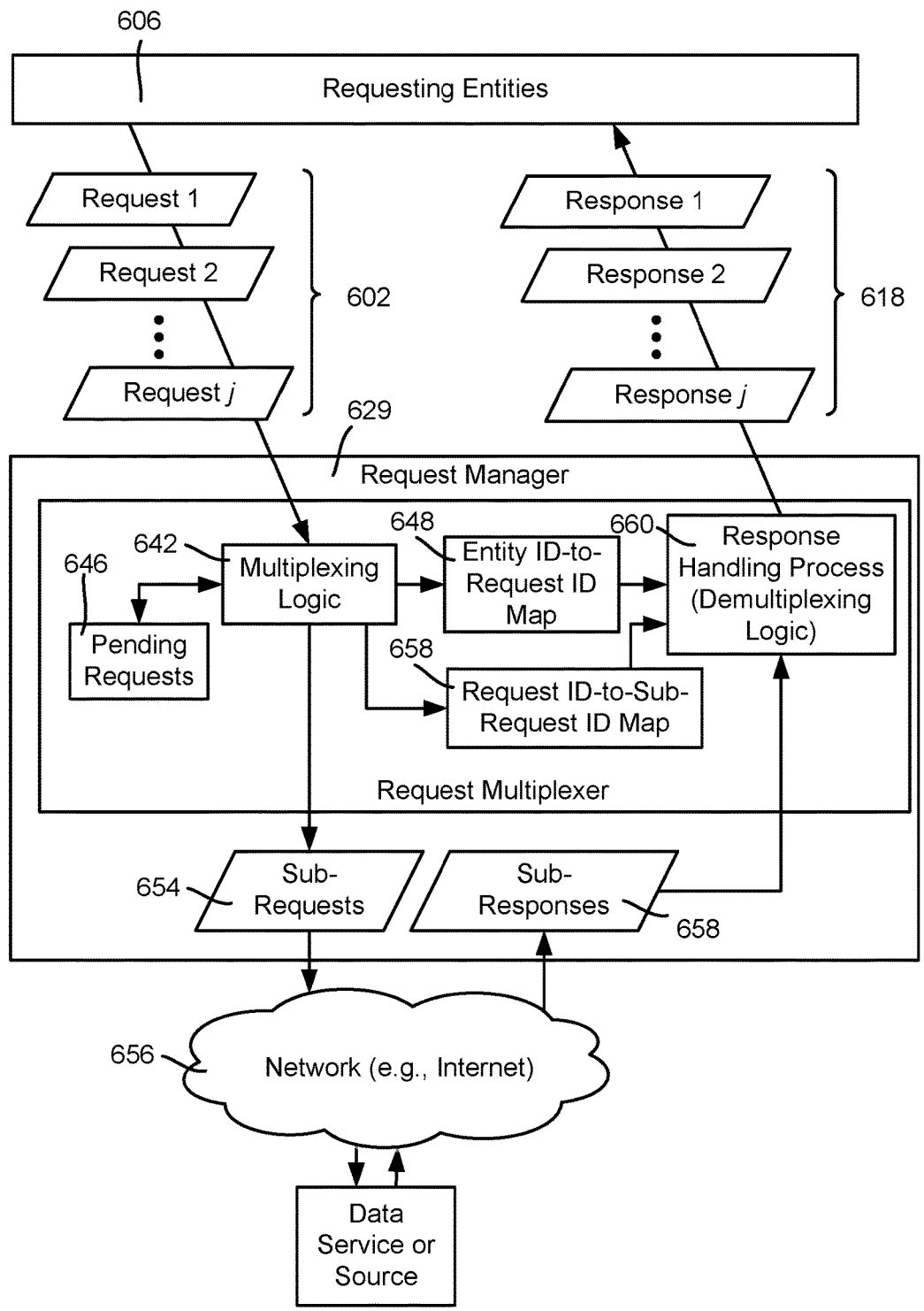
FIG. 6 is an example block diagram representation of a request manager (e.g., of a back-end data service server) that multiplexes requests for sending to one or more data sources, according to one or more example implementations.

FIG. 6 is similar to FIG. 4 with respect to batching and multiplexing requests, however there are some differences from the request manager versus the request manager 428 at the request handling server level of FIG. 4. For one, a given request may need to be broken up into separate requests ("sub-requests"). For example, a request for a tile or icon to represent a movie feature may actually be sent as a single movie ID request, but which by its type (e.g., "feature") is known by the system (e.g., via component rules) to correspond to separate requests, e.g., one for a title, another for a representative image, another for a rating, another for user like and dislike scores, yet another for a plot summary and so forth. Some of these sub-requests may be cached, while others may need to be obtained from a data service and (possibly different) data source(s). More than one data source may contain the sub-part, e.g., a URL that corresponds to a general representative image for a television show in one database may be overridden by an "editorial" database to show a different URL/image, e.g., for an uncharacteristic episode. Note that batching sub-requests may not always be possible because the data sources may vary in location, request format and/or the like.

To track sub-requests so that only full responses (as expected by the requesting entity) are returned, a request ID-to-sub-request ID map 658 is shown so that the de-multiplexing logic 660 can assemble a full response as its sub-responses come in. Rules or the like that specify how a type of request may need to be broken into component sub-requests may be accessed by the multiplexing logic 642, as described herein.

Figure 7:
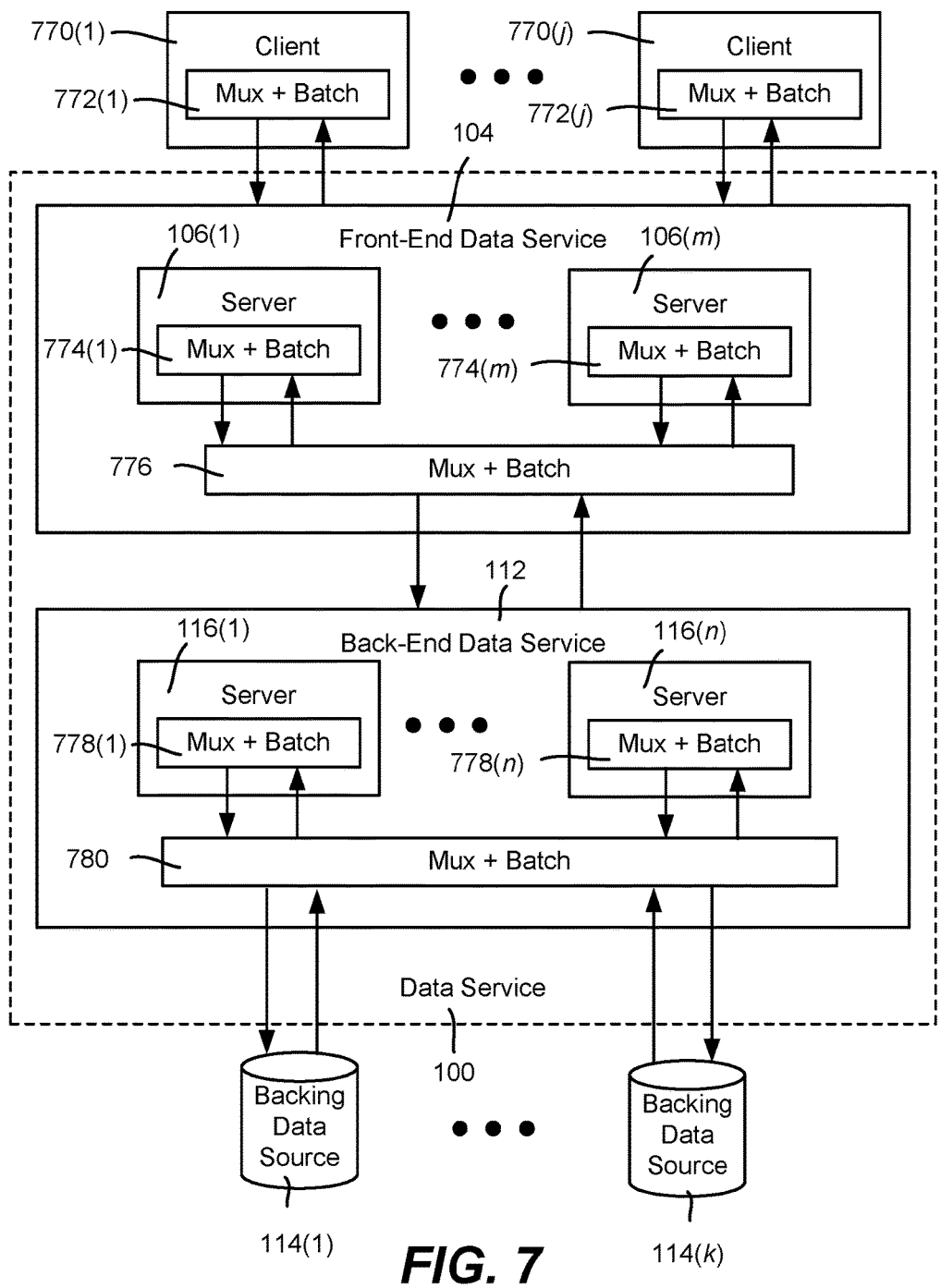
FIG. 7 is an example block diagram representation of how multiplexing and/or batching may be implemented at various levels, including in the clients and data service, according to one or more example implementations.

It should be understood that multiplexing operations, as well as batching operations, may be performed at any request-response level, including any time a requestor makes network requests to an entity that is intended to ultimately respond with the data (or an error response). For example, as represented in FIG. 7, in one or more implementations, client requestors 770(1)-770(j) may multiplex and/or batch requests via components 772(1)-772(j), respectively, to the data service 100. Each such request is processed by one of the load-balanced front-end servers 106(1)-106(m) of the front-end data service 104 to obtain corresponding responses. As represented via multiplexing and/or batching components 774(1)-774(m), each front-end server 106(1)-106(m) may multiplex and/or batch its requests. Note that the client requestors 770(1)-770(j) need not know about the front-end service 104, back-end service 112, and/or backing data sources 114(1)-114(k), and instead make the requests (e.g., HTTP internet requests) to a data-providing entity in general from the perspective of the client. In one or more implementations, the data service 100 couples to the clients via the front-end data service 104.

The back-end data service 112 may be the data-providing entity from the perspective of the front end servers 106(1)-106(m). However, in one or more implementations, it is feasible for the front-end data service 104 to include a front-end shared multiplexing and/or batching component 776 that multiplexes and/or batches the requests from its set of servers 106(1)-106(m) on their way to the back-end data service 112. Although not explicitly shown in FIG. 7, there may be more than one shared multiplexing and/or batching component, e.g., with the servers 106(1)-106(m) grouped into subsets, each subset sharing one of the multiplexing and/or batching components; (distribution by load-balancing or other means are alternatives to a fixed groups of subsets). It is also feasible to let each server individually multiplex and/or batch its requests to the back-end data service 112, whereby the shared component 776 is not needed.

Similarly, each back-end server 116(1)-116(n) of the back-end data service 112 may have multiplexing and/or batching components, shown as 778(1)-778(n), respectively.

At least one shared multiplexing and/or batching component 780 may multiplex and/or batch the requests from its set of back-end servers 116(1)-116(*n*); if implemented, more than one shared multiplexing and/or batching component 780 is feasible, as described above with respect to the front-end data service. It is also feasible to let the back-end servers 116(1)-116(*n*) each individually multiplex and/or batch its requests to the backing data sources 114(1)-114(*k*), whereby the shared component 780 is not needed. Thus, the back-end data source(s) 114 are the data-providing entity from the perspective of the back end servers 106(1)-106(*m*) or the back end data service 112 in general.

Figure 8:
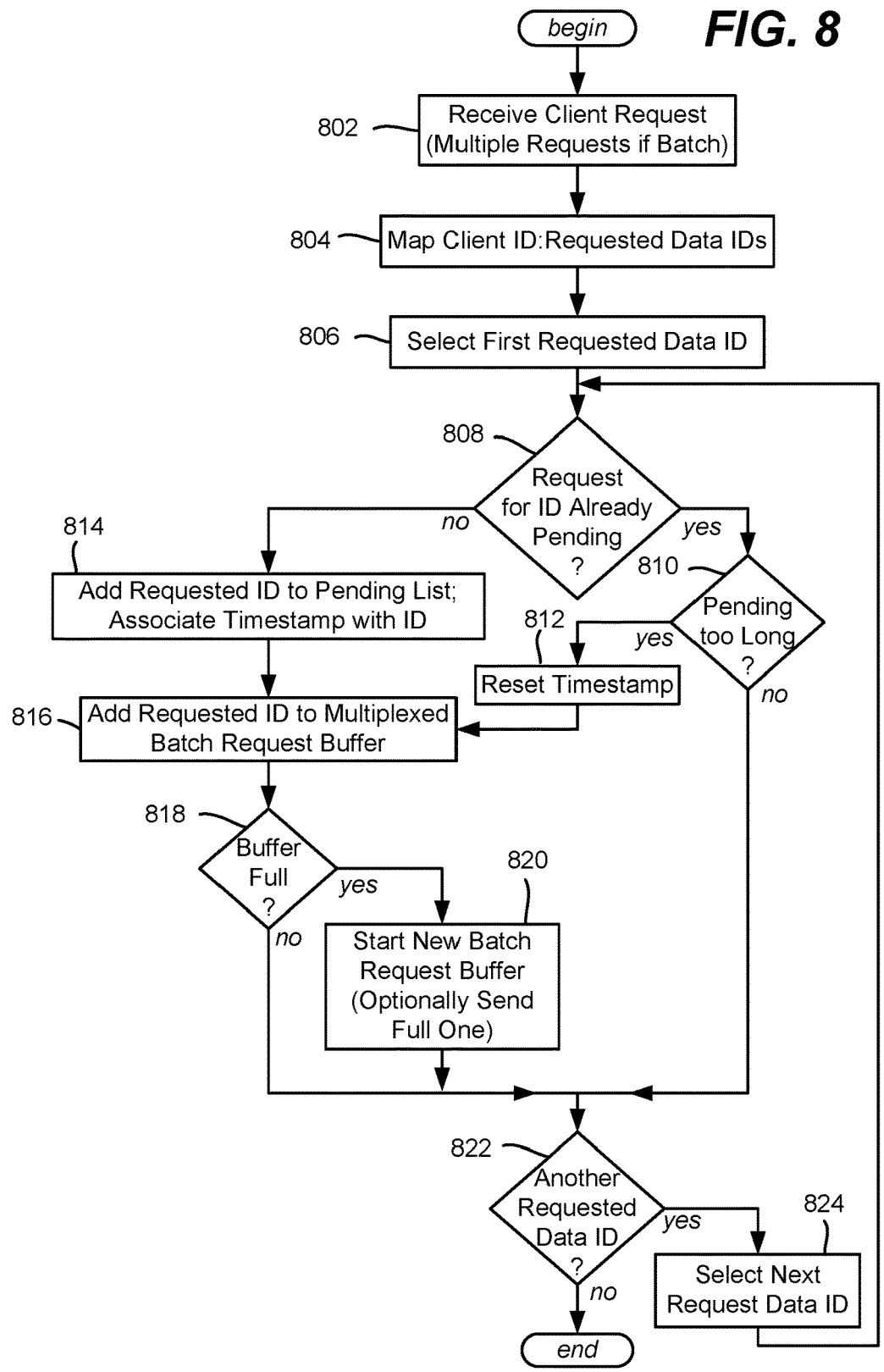
FIG. 8 is a flow diagram showing example logic/steps that may be taken to multiplex and batch data requests, according to one or more example implementations.

FIG. 8 is a flow diagram showing example steps that may be taken by a request manager, e.g., at the request handling server level (client front-end) with respect to multiplexing and batching operations. Step 802 represents receiving a client request, which may be a single "Get" request (or the like) with a data ID, or a batch request containing multiple data ID requests. The logic of FIG. 8 (as well as in the other drawings) handles either a single client request or a client batch request in the same way, by considering a single client request as if it was a "batch" request having a single item ID; (although in alternative implementations, single client requests may be handled separately from batch client requests, by generally similar logic). Thus, as used herein, except where otherwise notice a "batch" request may be one that contains a single data ID request, (even though such a single request may not technically be considered a proper batch request in other contexts).

Step 804 represents maintaining the client-to-requested ID(s) relationship, e.g., in the client ID-to-request ID map 448 (FIG. 4). With this information, a response is able to be returned to each client request for data, including when requests for the same data are multiplexed into a single request for that data and later de-multiplexed. If the same client makes multiple, separate requests, the map may contain a separate entry for each request so that the client gets back a response for each request.

Step 806 selects the first request (data item) ID (which may be the only one) for the batch request from this client. Step 808 evaluates whether a request for this data is already pending (e.g., from an early iteration of FIG. 8, whether by a previous request from the same client or from a different client), by checking the set of pending requests 446 (FIG. 4). If not already pending, step 808 branches to step 814, which adds the request for the data to the pending list; step 814 also associates a timestamp (or timer) with this data item ID. Step 816 sends the request to the batching process where it is added to the (multiplexed) batch request buffer; this corresponds to blocks 452 and 454 of FIG. 4. Note that it is feasible to associate the same timestamp with more than one item, e.g., each item in one batch request can share one timestamp, as long as the association with each data item and that timestamp is maintained.

Returning to step 808, in one or more implementations, a request that is in the pending set but is pending too long relative to some (e.g., heuristically determined) time limit is considered as likely to be an error, and thus no longer considered as pending for purposes of multiplexing. To detect such a situation, step 808 branches to step 810 to determine whether this pending request has been pending too long, e.g., based upon the associated timestamp (or a timer). If so, step 812 resets the timestamp associated with this data item ID, and step 816 adds the requested data item ID to the batch buffer. Otherwise step 810 branches to step 822 as described below. Note that the timestamp/time limit evaluated at step 810 may factor in the amount of time that will be taken before the buffer is actually sent, although, for example, this may be insignificant if the buffer is sent every one thirtieth of a second and the pending time limit is on the order of hundreds or thousands of milliseconds.

If the batch request buffer becomes full as checked at step 818, a new batch request buffer is started at step 820. A full buffer may be sent as a batch request to the next level (e.g., the back-end data service back-end in this example) along with any other buffer or buffers at the appropriate time, e.g., once per rendering frame. An alternative option is to instead send a full buffer as soon as full.

Step 822 checks whether there is another data ID to be handled from this client's request, as clients may send batch requests. If so, step 824 selects the next requested data ID in the batch and returns to step 808 to repeat the multiplexing (and batch adding) process until the batched set of received requests from the client have been handled.

Figure 9A:
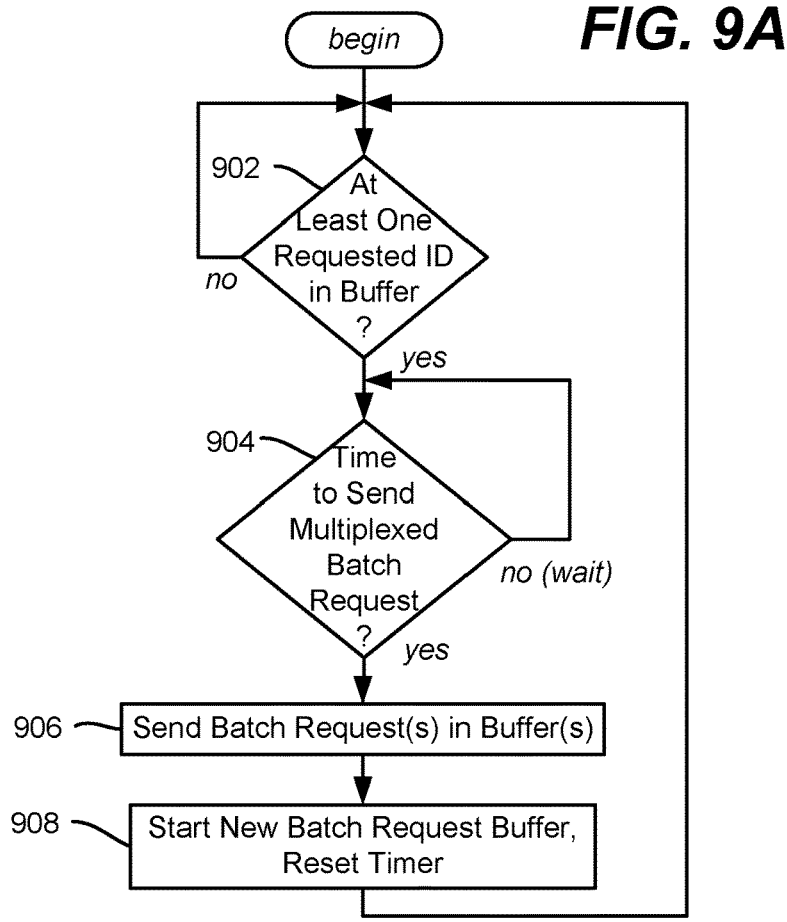
FIGS. 9A and 9B are flow diagrams showing alternatives of example logic/steps that may be taken to send batched data requests, according to one or more example implementations.
Figure 9B:
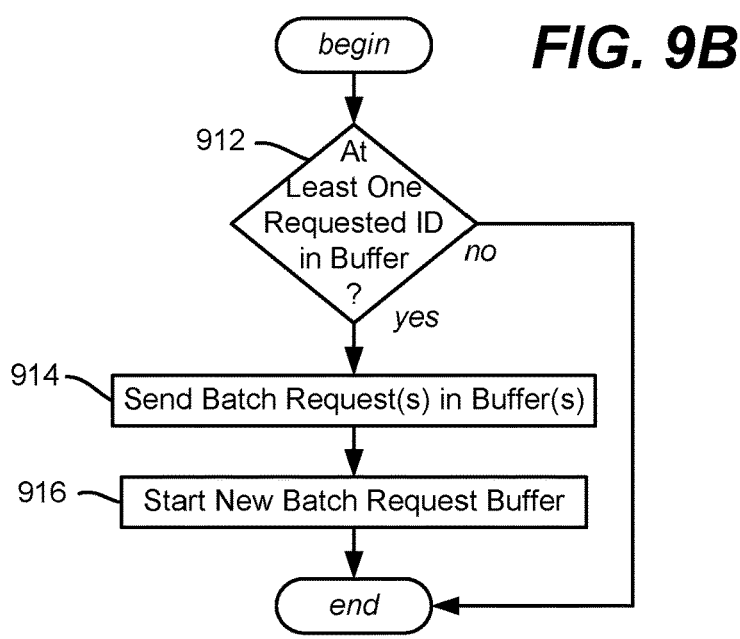

FIGS. 9A and 9B are flow diagrams showing example steps that may be taken to send the batch buffer in a batch request, such as to the back-end data service back-end service (in this example). Step 902 checks whether there is at least one request in the buffer; if not, the process waits for one. Note that an alternative is to not invoke the logic of FIG. 9A unless the buffer has at least one request therein. Step 904 represents delaying until it is time to send the batch request; it is understood that this is typically not a blocking operation, and that more requests may be being separately added to a buffer while waiting.

When time to send, step 906 sends a batch request corresponding to each match buffer; note that multiple buffers may need to be sent (unless a buffer is sent when it is filled, e.g., via the option at step 820 of FIG. 8). Step 908 starts a new batch request buffer, and step 908 resets the timer for the next send time.

FIG. 9B is generally similar to FIG. 9A except that FIG. 9B is called/triggered when it is time to send a batch request buffer, and thus the timer/time evaluation is not needed in the steps of FIG. 9B. As can be appreciated, either the logic of FIG. 9A or FIG. 9B, as well as other alternatives, may be used in a given system.

If in FIG. 9B at least one request is in a buffer at step 912, step 914 sends the buffer, or multiple buffers if more than one needs to be sent. Step 916 starts a new batch request buffer. Note that an alternative is to not trigger the logic of FIG. 9B unless the buffer has at least one request therein at the triggering time.

Once a buffer of one or more batched requests is sent, responses begin arriving to each request. In one implementation, as described herein, these responses are not returned in a batch form (e.g., by the back-end data service) but rather as soon as each one is ready, whereby each response may be de-multiplexed. Note that some responses may be from a data cache (of the back-end data service back-end in this example), while others may be obtained by calls to a physical data backing store, whereby the response times may be quite different. Further note that even though the responses are not received in batch form at the request handling server, the request handling server may combine the de-multiplexed responses into a batch response to match any batch request from any client.

Figure 10:
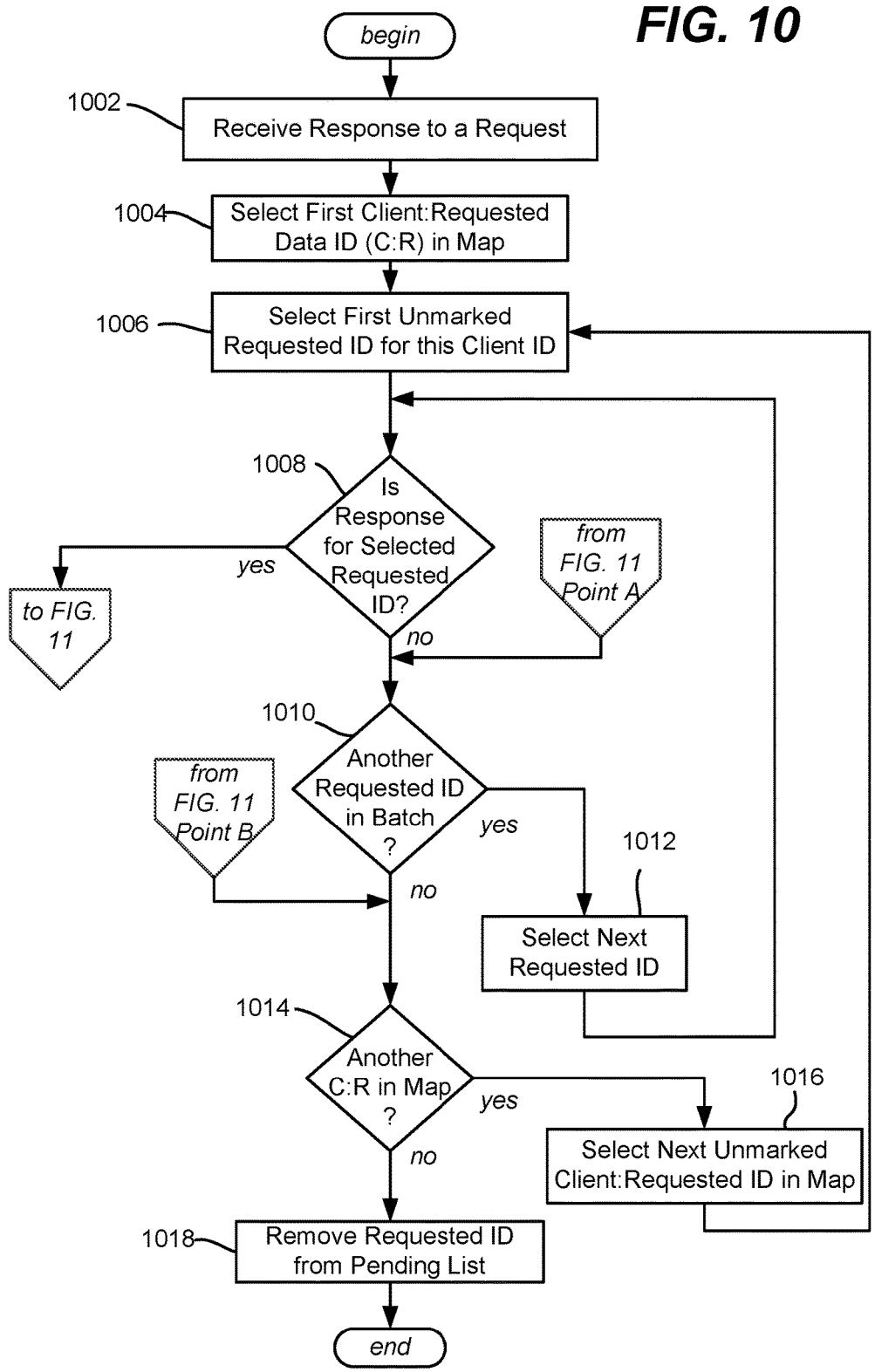
FIGS. 10 and 11 comprise a flow diagram showing example logic/steps that may be performed in handling a response received with respect to a request of a multiplexed, batched request set, according to one or more example implementations.
Figure 11:
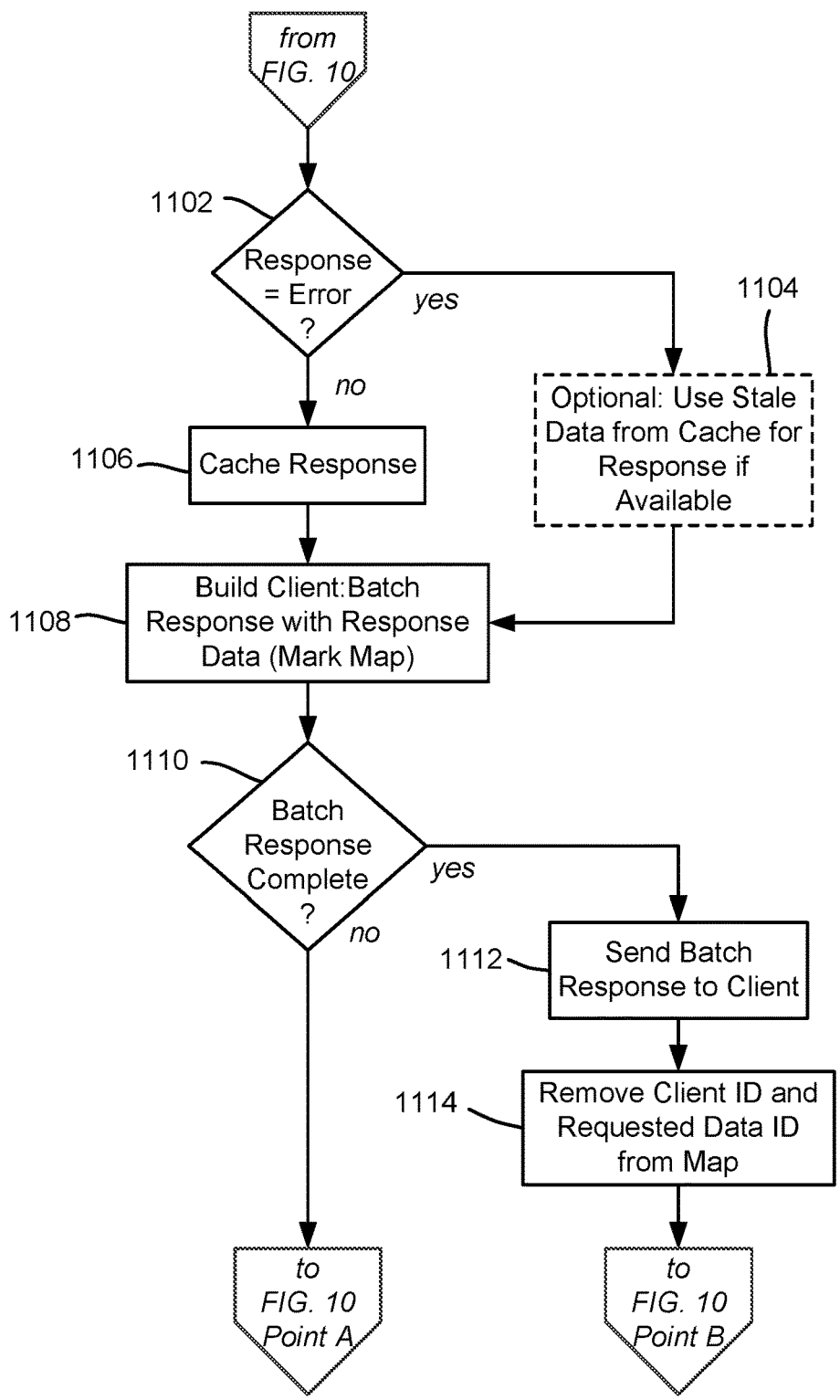

FIGS. 10 and 11 comprise a flow diagram showing example steps that may be taken when a response to a batched, multiplexed request is received, e.g., from the back-end data service, as represented by step 1002 of FIG. 10. Note that with respect to when an initiating client receives a response, FIGS. 10 and 11 are based on an implementation in which a batch response is returned to a requesting client only when each of that client's requested batch requests have received a response (which may include a timeout or other error response). Thus, a batch response is built from each of the separate responses for the corresponding requests before being returned as a single batch response to a client. Note that it is alternatively feasible to return individual responses to a client's batch request instead of waiting for each response; similarly batch response subsets (that may include more than one response but not all responses) may be returned instead of waiting for a complete batch response to be assembled.

In general, the steps of FIG. 10 along with the steps of FIG. 11 walk through the client ID-to-request ID map attempting to match the data ID in the currently received response back to each client's batch request, that is to de-multiplex the responses to the multiplexed requests. To this end, step 1004 selects the first client ID-to-requested data ID mapping in the client ID-to-request ID map. Step 1006 selects the first "unmarked" request ID for this client ID, that is, the first request ID that has not been marked as already having received a response for it.

Step 1008 evaluates whether the response is for the selected request ID. If so, the process continues to FIG. 11 as described below. If not, step 1010 looks for another unmarked request ID in the batch for this client ID, and if there is another such request ID, step 1012 selects this next request ID to look for a match with the response.

Steps 1014 and 1016 advance the process for each other client ID in the client ID-to-request ID map. When no client ID having a request ID remains to be compared, step 1018 removes the request ID from the pending list. Note that step 1018 may occur at the end of processing the response so that in implementations in which new client batch requests can be added to the client ID-to-request ID map, e.g., while the response is being processed against the earlier client batch requests, another request for the same data is not sent if it corresponds to this response.

When the response matches the selected request ID at step 1008, FIG. 11 is performed, generally to walk through each client's batch request to determine whether all requests in the batch request have received responses. If so, a batch response is returned to the requesting client with a full set of batched responses to the batch request. Note that alternative implementations may send a response to a corresponding requesting client as each response is received rather than batch the responses to match a client's batch request. If not all have been received, the next client request is similarly evaluated for a match until none remain.

To process a response, step 1102 of FIG. 11 represents determining whether the response was an error response. If so, the response will be sent as an error, although in one or more implementations it is an option to use stale data from the cache if such data is available rather than sending an error.

If not an error, step 1106 caches the response, and step 1108 begins to build the client batch response based upon the currently received response. In general, this may be performed by marking the client's requested data ID as received/handled; a pointer to the response data, e.g., maintained in a suitable data structure, may be used to reference this response's data.

Step 1110 evaluates whether the batch response is complete based upon this current response having been received, that is, no request ID remains unmarked for this client ID. If not, step 1110 returns to FIG. 10 at entry point A to evaluate whether the response also matches another request ID in the client's batch request. Note that a client batch request should not contain a request for the same data twice, and if this can be guaranteed, then step 1110 can instead return to FIG. 10 at entry point B. Otherwise a batch request containing the same requested data more than once (e.g., A, B, A, D) may result in a batch request that never has a response thereto returned, because the replicated request ID may never be evaluated and thus may remain unmarked.

If the batch response is complete at step 1110, step 1112 sends the batch response back to the client and step 1114 removes the client ID and its mapped-to requested data ID(s) from the map. Step 1114 returns to FIG. 10 at entry point B. As described above, this entry point corresponds to step 1014, where the process looks for whether there is another client ID with one or more data requests to match against the current response; if so, the process repeats matching the current response against the next client's request IDs, until no client request IDs along with their request IDs remain to be evaluated.

It should be noted that a response that is not an error is cached by the request handling server at possibly different levels, e.g., as performed by the cache framework in one or more implementations. As a result, further requests for the same data will be returned from the cache, at least until expired or otherwise removed from the cache. However, in the event that cache updating is relatively slow, such that the cache(s) cannot be updated before another request for the same data comes in, then it is feasible to delay removing the request ID from the pending list while also leaving the response in its response data structure for a while. In this way, if another request for that same data comes in, (because the cache had not yet been updated), another request will not be sent (because the request ID is still in the pending request ID list), with the request instead able to be satisfied from the response data structure via straightforward detection logic, e.g., by maintaining a delayed removal list and matching incoming requests against this list.

Figure 12:
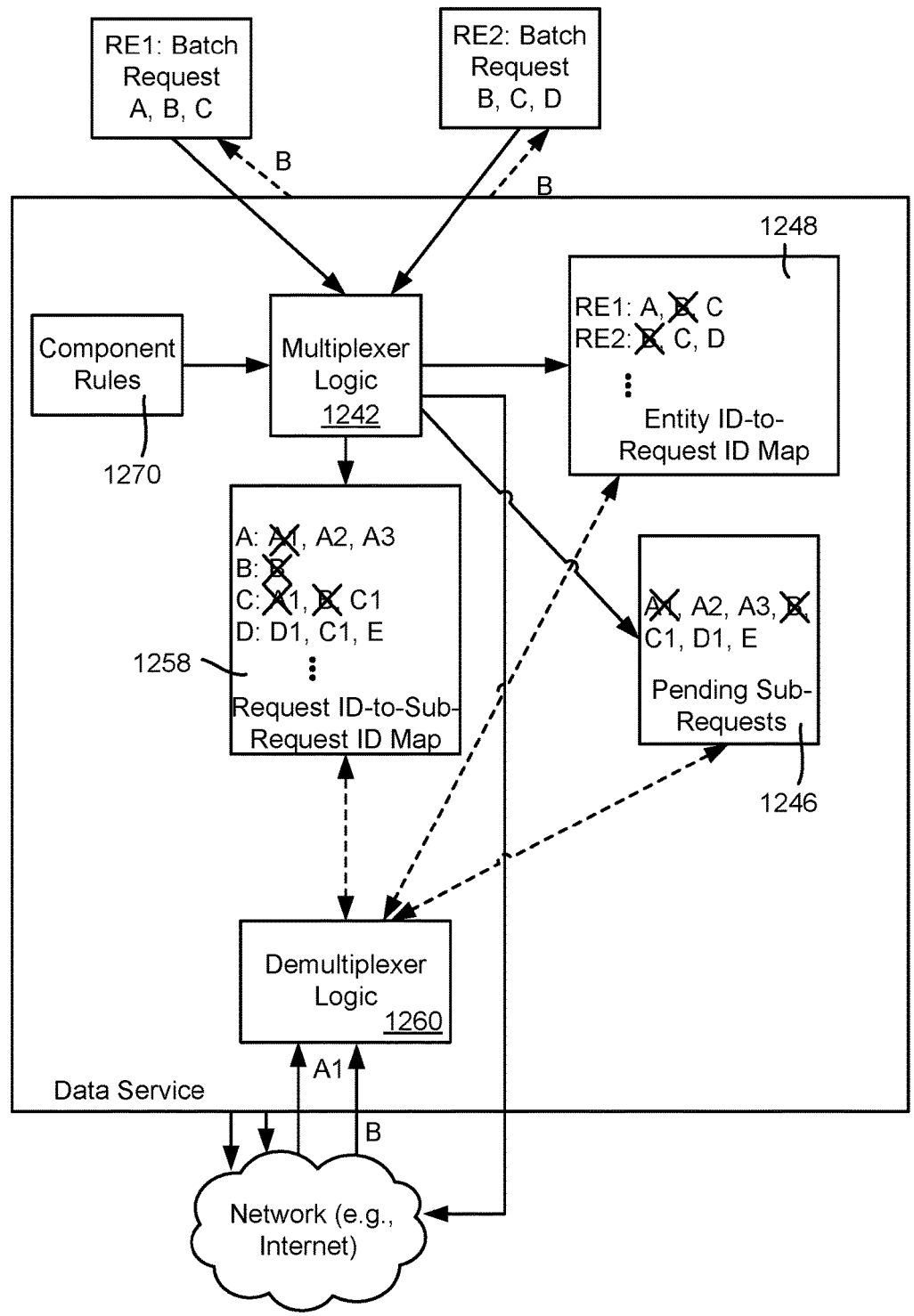
FIG. 12 is an example block and representation of a request manager (e.g., of a data service) showing how data requests may be separated into sub-requests that are multiplexed and sent, with sub-request responses returned and de-multiplexed for returning, according to one or more example implementations.

Turning to another aspect, namely the multiplexing of data when a request for data corresponds to sub-requests for smaller data items, FIG. 12 shows an example data service 1210 containing multiplexer logic 1242. Multiplexed, batched requests are received from the requesting entity, e.g., shown as RE1 and RE2. Requests that cannot be satisfied from a cache are sent to the multiplexer logic 1242, which among other operations maintains the requesting entity IDs, shown as RE1 and RE2, in the entity ID-to-request data ID map 1248 in conjunction with their respective batch requests (A, B, C) and (B, C, D).

The multiplexer logic 1242 uses component rules 1270 to process these requests into sub-requests as appropriate; (a request that does not need to be broken up may be considered a "single" sub-request). For any duplicate sub-requests, the multiplexer logic 1242 maintains a single instance of the sub-request ID in a pending sub-request list, and sends a single request.

As responses to the sub-requests are received, the de-multiplexer logic 1260 reassembles the sub-requests via the request ID-to-sub-request ID map 1258 to build towards composing full request(s), and removes the sub-request from the pending list. When a full request is complete, the de-multiplexer logic 1260 returns the full request to each requesting entity via the entity ID-to-request ID map 1258, and marks the request as handled. When all requests for an entity are marked handled, the de-multiplexer logic 1260 removes the entity ID and its marked request IDs from the entity ID-to-request ID map 1258.

Note that because all the way requests are built and cached, their sub-requests may not be independent of one another in one or more implementations. In such implementations, an error message with respect to any one sub-request causes the entire request to fail. However, in some scenarios it may be feasible to return stale data from a cache (if it exists) in response to a failed request rather than return an error.

Figure 13:
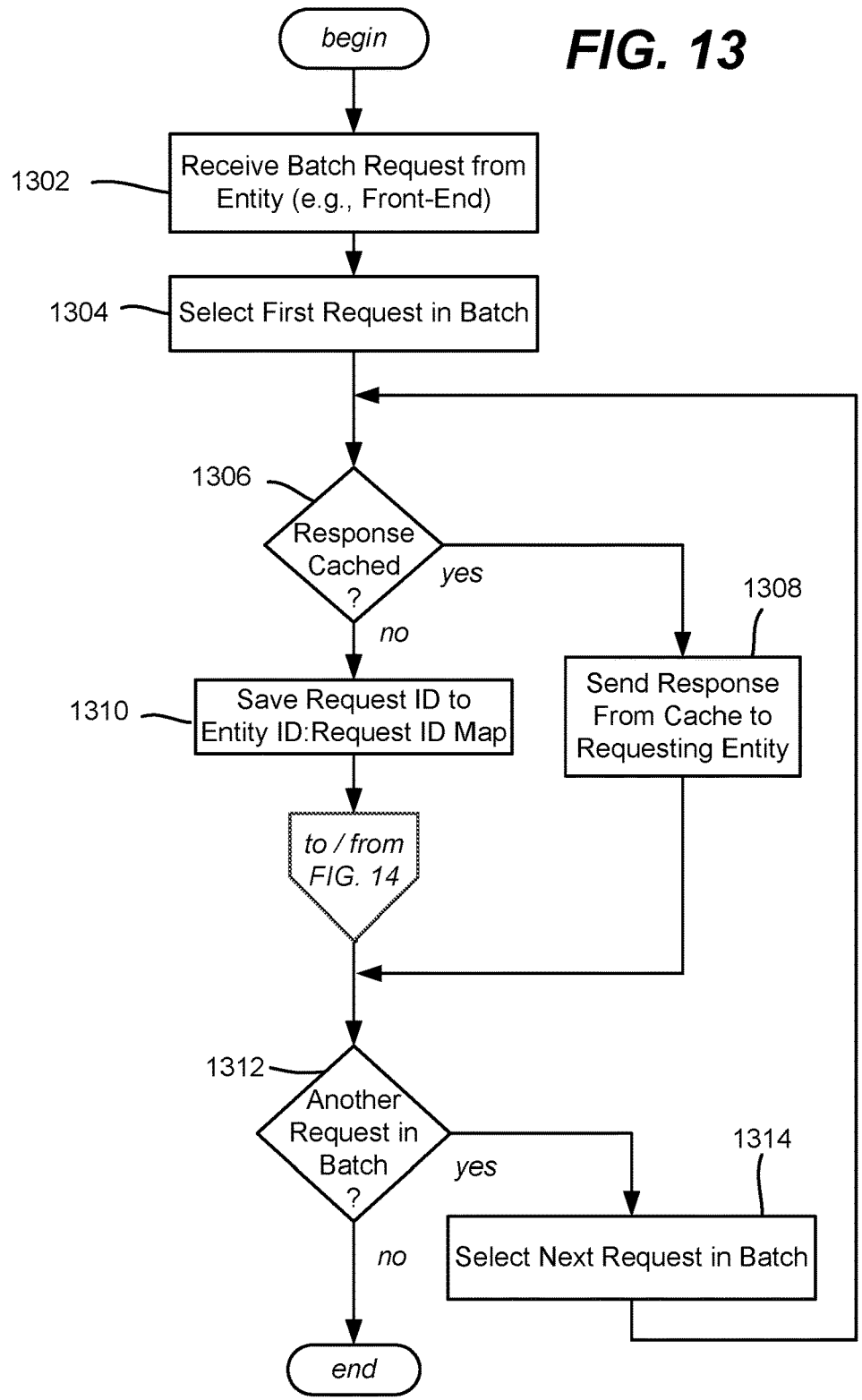
FIGS. 13 and 14 comprise a flow diagram showing example steps/logic that may be taken (e.g., at a data service) upon receiving a batch request (e.g., from a request handling server) to obtain responses to each request, including via request multiplexing operations, according to one or more example implementations.
Figure 14:
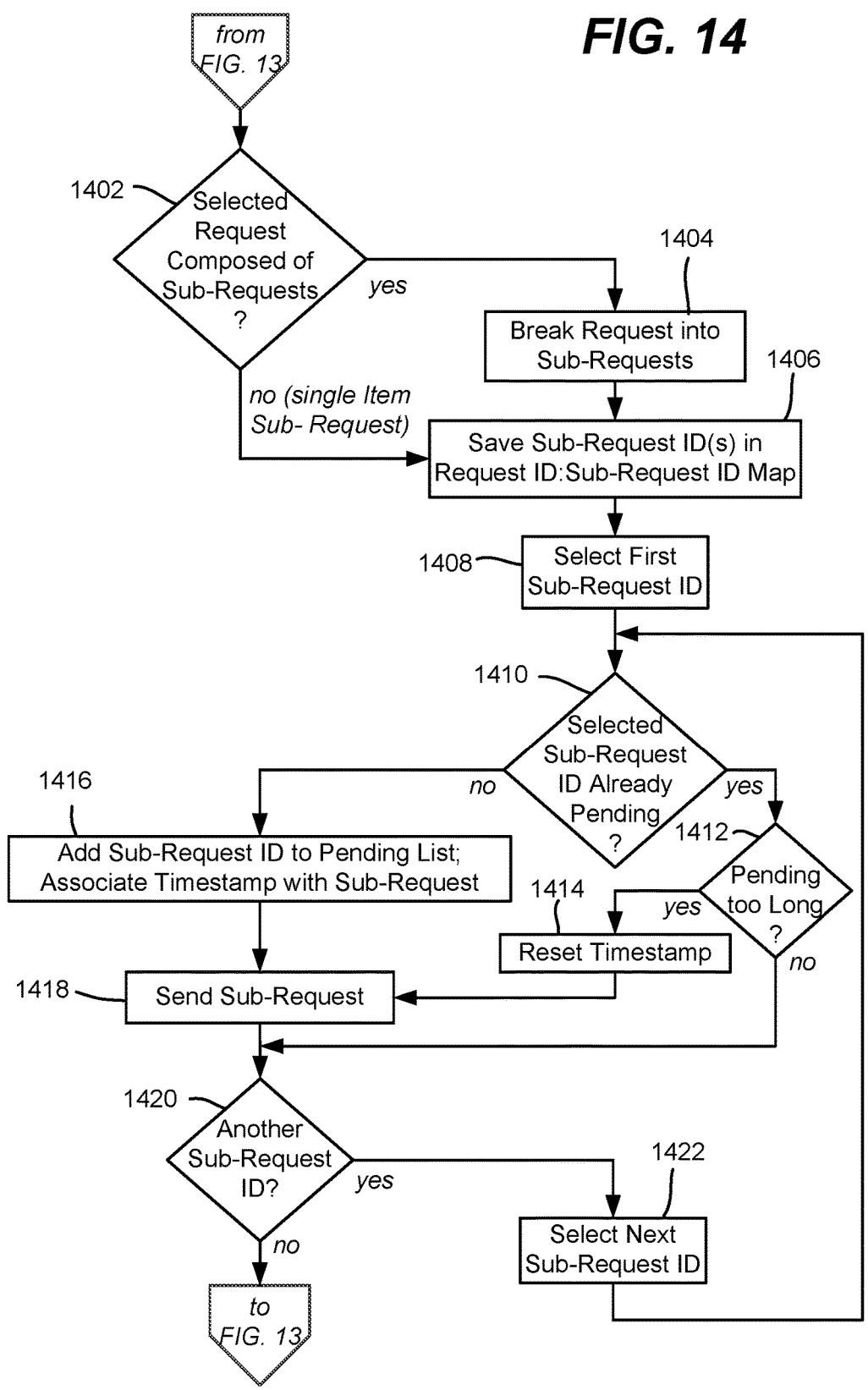

FIGS. 13 and 14 are directed to example operations for dealing with requests that may be broken up into sub-requests. Step 1302 represents receiving a batch request for data, e.g., sent via step 906 of FIG. 9A or step 914 of FIG. 9B. As described herein, at any level where data is requested, there may be one or more caches for responding to requests.

Thus, upon receiving a batch request at step 1302, step 1304 selects the first request therein. Step 1306 evaluates whether the request may be satisfied by data in a cache. If so, a response is sent to the entity via step 1308; (in this particular example, responses to batched requests are not batched in this example implementation, but batched responses may be returned for batch requests as described herein). Step 1308 then advances to step 1312, which in conjunction with step 1314, continues to process requests in the batch request until none remain to be processed.

If unable to be satisfied from the cache, step 1310 adds the request ID to an entity entry in the entity ID-to-request ID map; the entity ID entry may need to be created in the map as part of step 1310. The process then continues to FIG. 14, step 1402.

Step 1402 of FIG. 14 evaluates whether the currently selected request from the batch is one of a type that needs to be broken into sub-requests. If so, via the component rules for that type, step 1404 separates the request into its sub-requests. Step 1406 saves sub-request IDs (or a single "sub-request" ID if not broken up at step 1404) into the request ID-to-sub-request ID map.

Step 1408 begins processing the sub-requests, by selecting the first sub-request. If not already pending (e.g., from a different request in the batch that spawns the same sub-request or from a request in another data handling server's batch request), the sub-request ID is added to the pending list at step 1416 (and a timestamp or associated with the ID), and the sub-request sent to the source of the data, e.g., a data service or other source at step 1418. Note that if batching such sub-requests is provided, the sub-requests may be batched rather than being individually sent, as generally described above with respect to batching requests. Further note that some requests may be received in a batch request from different requesting entities, e.g., in FIG. 12 both RE1 and RE2 have sent requests B and C in their respective batch requests, and thus their sub-requests will be the same and can be multiplexed. Even if no two identical requests are received, request A may be broken into sub-requests A1 and A2 and a different request B may be broken into sub-requests A1 and Z9, whereby sub-requests A1 are the same and may be multiplexed.

Returning to step 1410, a timer may be associated with each sub-request so that if pending too long, e.g., as heuristically determined, the sub-request may be re-sent (similar to as described above with reference to FIG. 8). Thus, step 1412 evaluates the timestamp (or timer) for an already pending sub-request, and if taking too long relative to a sub-request time limit, the timestamp is reset (step 1414) and the sub-request re-sent (step 1418). Note that alternatively, or in addition to, a separate process can scan the pending sub-request list and re-send sub-requests that are taking too long.

Steps 1420 and 1422 repeat the multiplexing and single-instance sub-request sending (or batching), until no more sub-requests remain for this request. When no sub-requests for the selected request remain, step 1420 returns to step 1312 of FIG. 13. Steps 1312 and 1314 repeat the process to select each other request (if any) in the batch request for similar processing until none remain.

Figure 15:
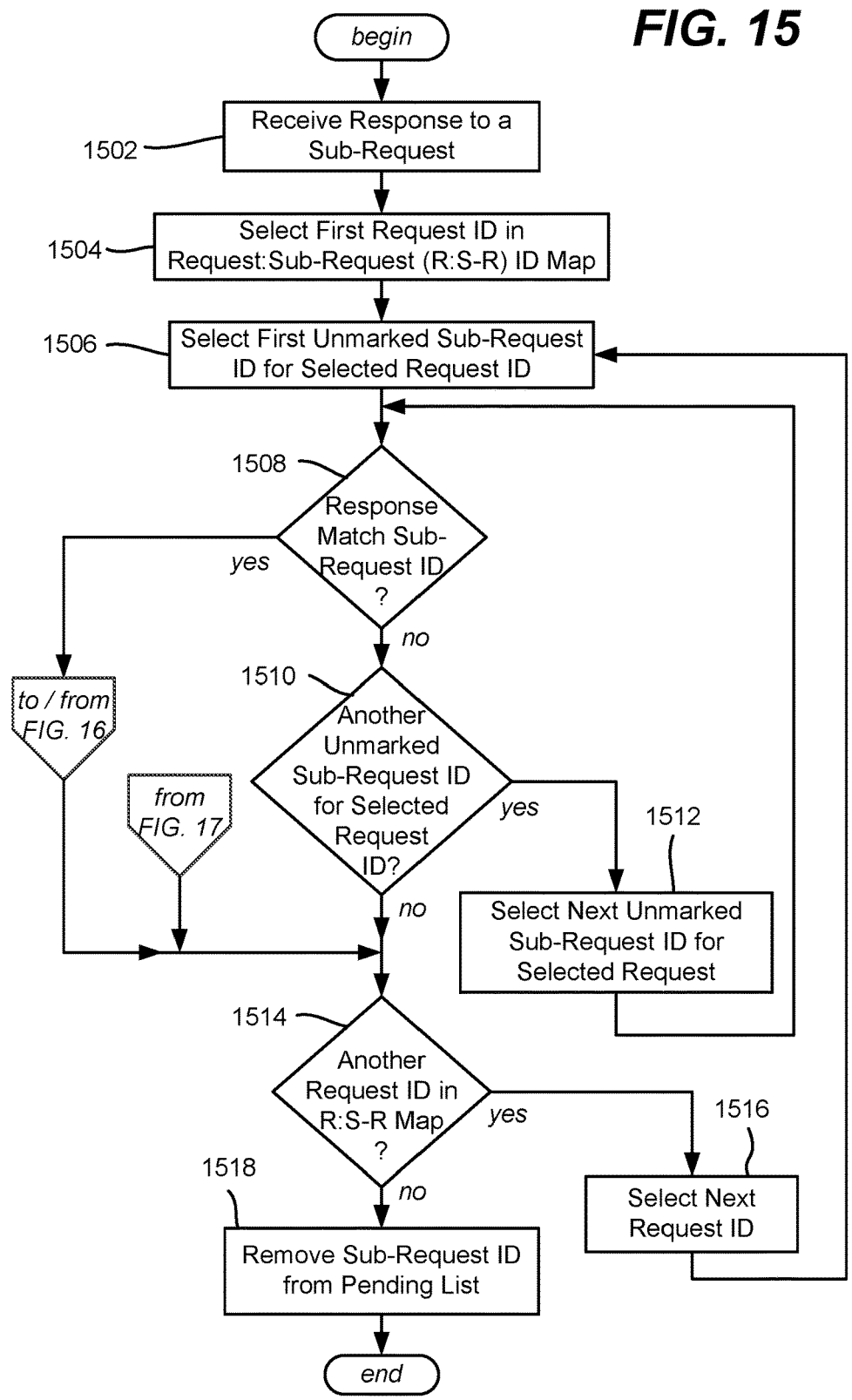
FIGS. 15-17 comprise a flow diagram showing example logic/steps that may be performed in handling a response received with respect to a sub-request of multiplexed sub-requests, according to one or more example implementations.
Figure 16:
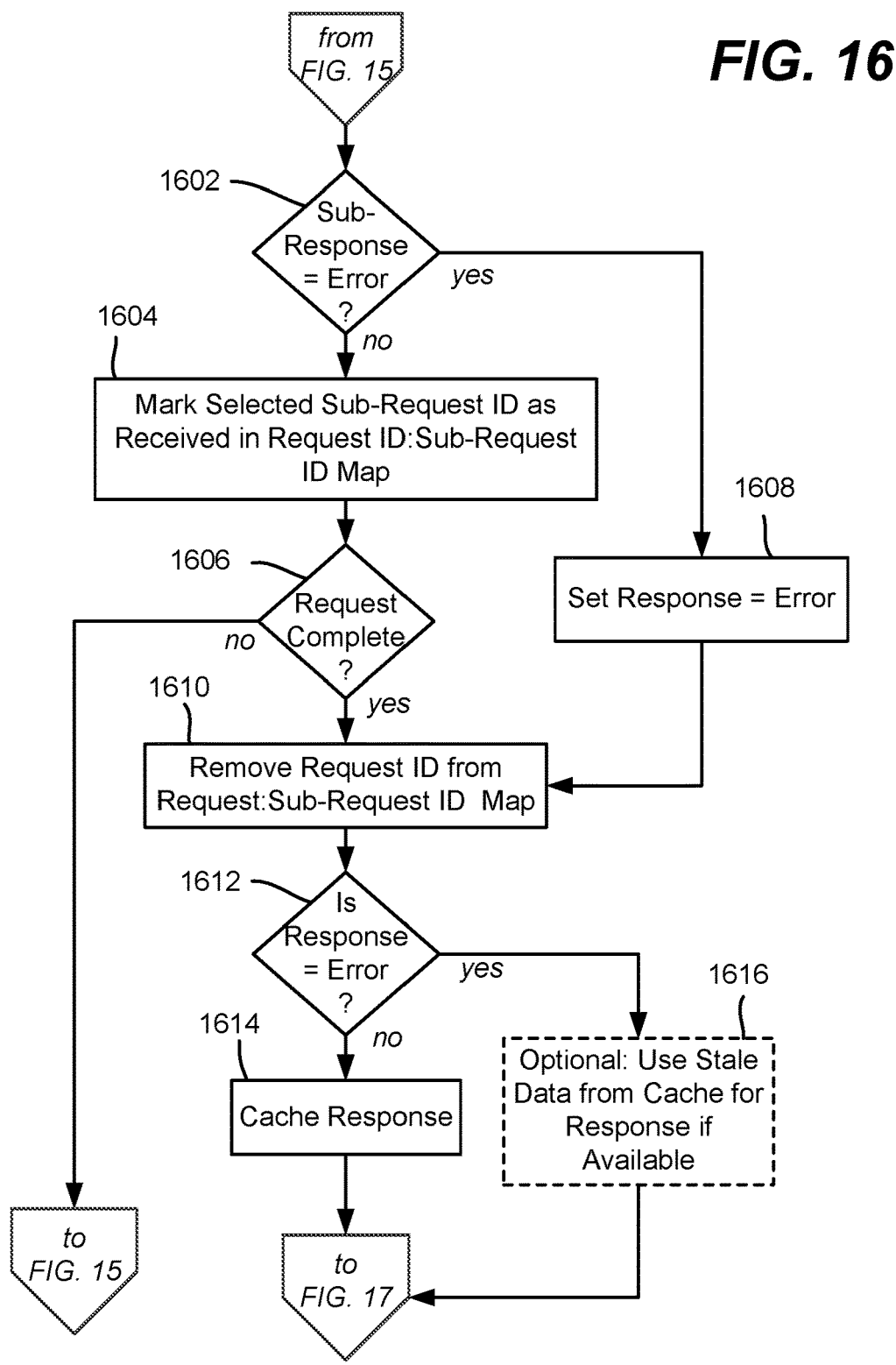
Figure 17:
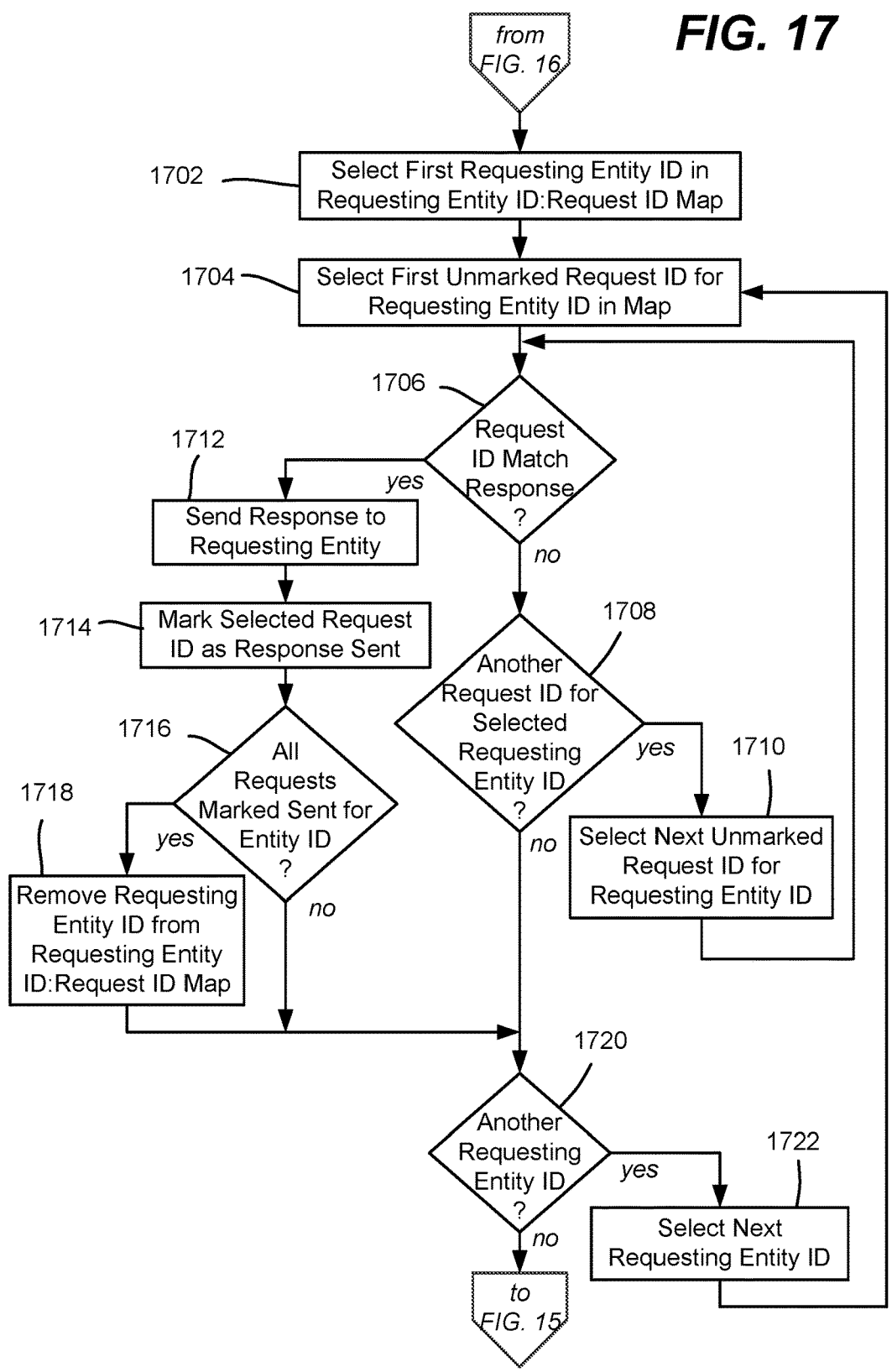

FIGS. 15-17 comprise a flow diagram with example steps for handling a response to a sub-request that is received at step 1502 of FIG. 15. Step 1504 selects the first request ID in the request ID-to-sub-request ID map, and step 1506 selects the first unmarked sub-request ID for the selected request ID; (note that received sub-requests are marked as handled once processed and thus need not be processed again).

Step 1510 evaluates whether the currently-received response being processed matches the selected sub-request ID. If not, step 1510 looks for the next unmarked sub-request ID for this currently selected request, and if one exists, step 1512 selects that next sub-request ID for matching against the currently received response, until no sub-requests remain for the currently-selected request.

If instead step 1508 determined that the response matched the sub-request ID, the process continues to FIG. 16 step 1602. Step 1602 evaluates whether the sub-response was an error message. If not, at step 1604 the selected sub-request ID for the currently selected request ID is marked in the request ID-to-sub-request ID map as having been received. The process continues to step 1606, which evaluates whether the request is complete, that is, all sub-requests have been received for this request. If not complete at step 1606, the process returns to FIG. 15, step 1514 to select another, next request ID (step 1516), if any, to determine whether the sub-response is part of that next request. When all sub-request IDs have been evaluated against the currently received sub-request response, the sub-request ID may be removed from the pending list at step 1518.

Note that FIG. 16 does not return from step 1606 to step 1510 of FIG. 15 because there is no situation in which a request is composed from more than one instance of the same sub-request. If for some reason this situation could occur, then step 1606 may instead return to step 1510 of FIG. 15.

Returning to FIG. 16, if at step 1602 an error message was received, step 1608 sets the entire response equal to an error message; (again, because in this example implementation, any error in a sub-request results in the entire request being considered an error). The process continues to step 1610.

Step 1610 is performed if at step 1606 the request was determined to be complete, or if the sub-response was determined to be an error at step 1602, in which event the entire response is an error and is thus also considered complete. Step 1610 removes the request ID from the request to sub-request ID map.

Step 1612 evaluates whether the response is an error (as set at step 1608). If not, the response is cached at step 1614. Otherwise, an option is to use stale data from the cache for the response, if such stale data is available (step 1616).

Following step 1614 or step 1616, the process continues to FIG. 17, step 1702 to return the complete response to the requesting entity or entities. To this end, FIG. 17 (in general) walks through the requesting entity ID-to-request ID map and sends the request to each entity having that request mapped for it.

Step 1702 selects the first requesting entity ID in the requesting entity ID-to-request ID map. Step 1704 selects the first unmarked request ID for the selected requesting entity ID; (where marked indicates handled and returned).

Step 1706 evaluates whether the currently selected request ID of the currently selected entity ID matches the completed response. If not, steps 1708 and 1710 repeat the process for the next unmarked request ID until none remain for this entity.

If there is a match, step 1712 sends the response to the requesting entity and step 1714 marks the selected request ID as having its response sent. Step 1716 then determines whether all requests are marked as having been sent for this entity ID. If so, step 1718 removes the requesting entity ID from the requesting entity ID-to-request ID map. Note that if the response is part of a batch response to a batch request, the response may be used to build a batch response that is sent when completely built, as described herein.

Steps 1720 and 1722 repeat the process for each entity ID in the requesting entity ID-to-request ID map until none remain. At this time, the currently received sub-request has been handled for this request ID, however the currently received sub-request may be mapped to one or more other request IDs in the request ID-to-sub-request ID map, and thus step 1720 returns to step 1514 of FIG. 15 to continue processing against any remaining request IDs. When no request IDs remain, the currently received response to the sub-request has been handled, and thus step 1514 branches to step 1518 to remove the sub-request ID from the pending list. Again, delayed removal from the pending list along with maintaining the sub-request data while delaying is feasible to temporarily avoid requesting again, e.g., if caching is relatively slow.

As can be seen, the number of data item requests to a data-providing entity may be reduced by multiplexing requests for the same data item into a single request, and then de-multiplexing the single response having that same data into a response to each requestor of that data item. Multiple data items, including multiplexed request(s), may be batched together for sending to the data-providing entity.

One or more aspects are directed towards receiving a first request for data associated with a first data identifier from a first requesting entity, maintaining mapping information for the first request that associates the first data identifier with the first requesting entity, receiving a second request for the data associated with the first data identifier from a second requesting entity and maintaining mapping information for the second request that associates the first data identifier with the second requesting entity. Upon determining that the first data identifier applies to the first request and to the second request, the data associated with the first data identifier is requested from a data-providing entity in a multiplexed request, with a response to the multiplexed request received from the data-providing entity, in which the response includes the data associated with the first data identifier. Aspects include returning a first response to the first request, including accessing the mapping information to include the data associated with the first data identifier in the first response, and returning a second response to the second request, including accessing the mapping information to include the data associated with the first data identifier in the second response.

The first data identifier may be added to a pending set, so as to determine that the first data identifier applies to the first request and the second request by detecting the first data identifier in the pending set as being present in the second request. Upon determining that no other request needs a response that includes include the data associated with the first data identifier, the first data identifier may be removed from the pending set. A third request for data associated with the first data identifier may be received from a third requesting entity before the first data identifier is removed from the pending set, with a third response to the third request that includes the data associated with the first data identifier returned in the third response.

Requesting the data associated with the first data identifier in the multiplexed request may comprise including the multiplexed request as part of a batch request, and communicating the batch request to the data-providing entity. Including the multiplexed request as part of the batch request may include adding the multiplexed request to a batch buffer, and further comprising, adding the first data identifier to a pending set in conjunction with adding the multiplexed request to the batch buffer.

The first request may be part of a batch request from a client requesting entity; if so, described is building a batch response that includes the data associated with the first data identifier and other data associated with at least one other identifier, and returning the batch response.

Other aspects may include breaking the multiplexed request into a plurality of corresponding sub-requests, and reassembling responses to the plurality of corresponding sub-requests into a response to the request. A sub-request may be multiplexed with at least one other matching sub-request to obtain a single response to the multiplexed sub-request, with the single response and de-multiplexed into sub-responses to the sub-request and to the at least one other matching sub-request. At least one sub-request may be returned with data obtained in a cache.

One or more aspects are directed towards a request handling entity that receives requests for data items from requesting entities, and a request manager of the request handling entity. The exemplified request manager includes a request multiplexer that that maintains a set of zero or more pending requests, and for each request for a data item, associates that data item request with its requesting entity in a map, and evaluates the set of pending data item requests to not request that data item more than once from a data-providing entity when another request for that data item is pending. A request de-multiplexer de-multiplexes responses from the data-providing entity, including for each data item received in each response, to access the map to re-associate that data item with each requesting entity that requested the data item for returning in a response to that requesting entity.

The requesting entities may comprise clients, the request handling entity may comprise a front-end data server, and the data-providing entity may comprise a back-end data service. The requesting entities may comprise front-end data servers, the request handling entity may comprise a back-end data service, and the data-providing entity may comprise one or more backing data stores.

A data item may be requested as part of a batch request from a requesting entity. The request manager may include a batching process coupled to the request multiplexer, with the batching process configured to combine a plurality of requests for data items from the request multiplexer into a batch request to the data-providing entity. The batching process may combine the plurality of requests for data items from the request multiplexer into a batch request per timeframe.

The request multiplexer may consider another request for a data item to not be pending if an already pending request for that data item has been pending too long.

One or more aspects are directed towards receiving a first request for a first data item from a first requestor, maintaining a mapping that associates the first requestor with the first request, determining for the first request whether another request for the first data item is already pending, and if not, adding an identifier of the first data item to a pending set and making a single request for the first data item to a data providing entity, and if so, awaiting a response to the other request for the first data item. Aspects include receiving a second request for the first data item from a second requestor, maintaining a mapping that associates the second requestor with the second request, determining for the second request that a request for the first data item is already pending, and awaiting a response to the other request for the first data item. Upon receiving response data corresponding to the single request for the first data item, described herein is accessing the mapping to return the response data received for the first data item in a response to the first request from the first requestor, and accessing the mapping to return the response data received for the first data item in a response to the second request from the second requestor. The first data item identifier may be removed from the pending set.

Making the single request for the first data item may include adding an identifier of the first data item to a batch request, and sending the batch request to the data-providing entity. The request for the first data item may be broken up into a plurality of sub-requests.

Example Computing Device

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 18 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 18:
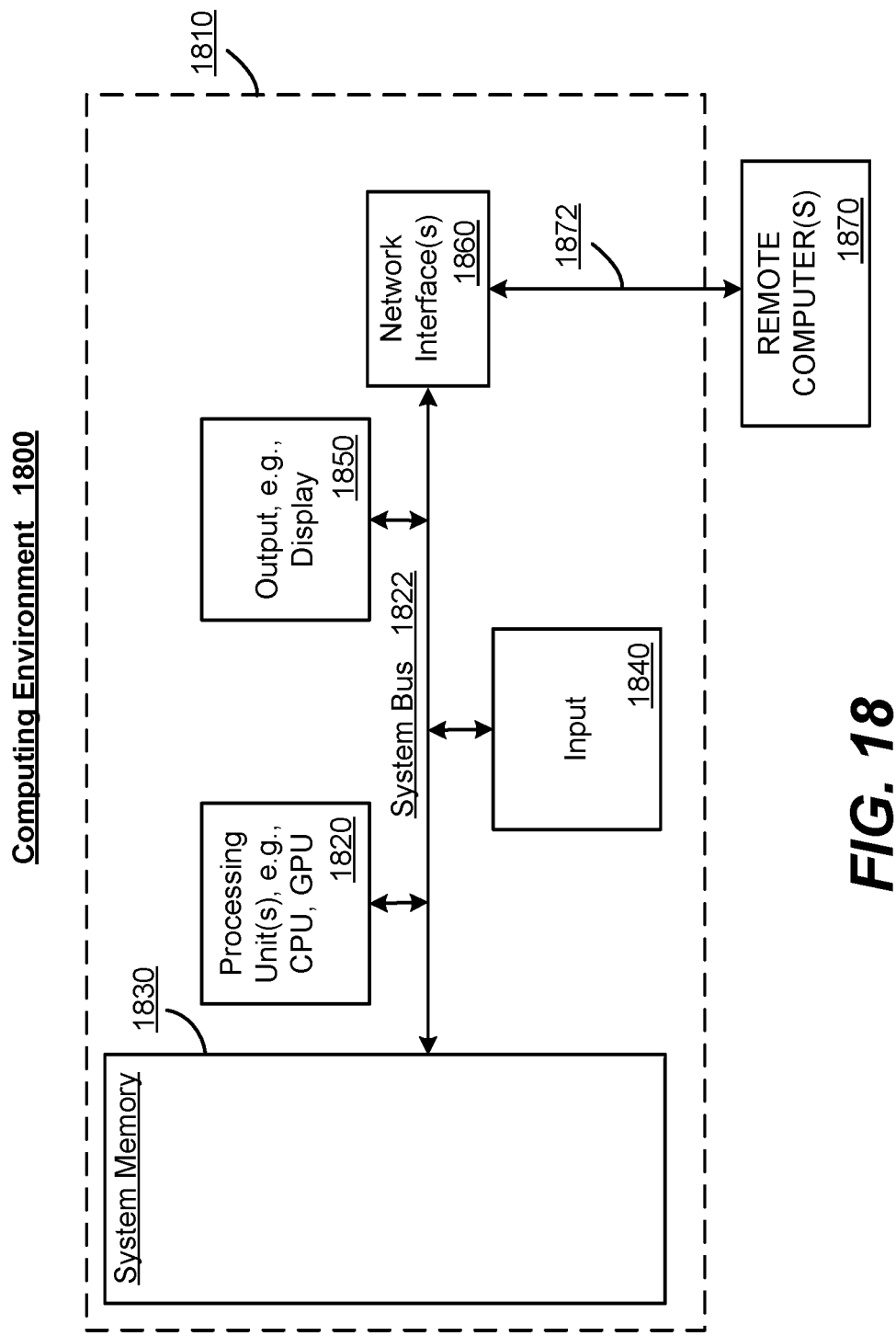
FIG. 18 is a block diagram representing an example computing environment into which aspects of the subject matter described herein may be incorporated.

FIG. 18 thus illustrates an example of a suitable computing system environment 1800 in which one or aspects of the implementations described herein can be implemented, although as made clear above, the computing system environment 1800 is only one example of a suitable computing environment and is not intended to suggest any limitation as to scope of use or functionality. In addition, the computing system environment 1800 is not intended to be interpreted as having any dependency relating to any one or combination of components illustrated in the example computing system environment 1800.

With reference to FIG. 18, an example device for implementing one or more implementations includes a general purpose computing device in the form of a computer 1810. Components of computer 1810 may include, but are not limited to, a processing unit 1820, a system memory 1830, and a system bus 1822 that couples various system components including the system memory to the processing unit 1820.

Computer 1810 typically includes a variety of machine (e.g., computer) readable media and can be any available media that can be accessed by a machine such as the computer 1810. The system memory 1830 may include computer storage media in the form of volatile and/or nonvolatile memory such as read only memory (ROM) and/or random access memory (RAM), and hard drive media, optical storage media, flash media, and so forth. By way of example, and not limitation, system memory 1830 may also include an operating system, application programs, other program modules, and program data.

A user can enter commands and information into the computer 1810 through one or more input devices 1840. A monitor or other type of display device is also connected to the system bus 1822 via an interface, such as output interface 1850. In addition to a monitor, computers can also include other peripheral output devices such as speakers and a printer, which may be connected through output interface 1850.

The computer 1810 may operate in a networked or distributed environment using logical connections to one or more other remote computers, such as remote computer 1870. The remote computer 1870 may be a personal computer, a server, a router, a network PC, a peer device or other common network node, or any other remote media consumption or transmission device, and may include any or all of the elements described above relative to the computer 1810. The logical connections depicted in FIG. 18 include a network 1872, such as a local area network (LAN) or a wide area network (WAN), but may also include other networks/buses. Such networking environments are commonplace in homes, offices, enterprise-wide computer networks, intranets and the Internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method comprising:
   receiving a first request for data associated with a first data identifier from a first requesting entity;
   maintaining mapping information for the first request that associates the first data identifier with the first requesting entity;
   receiving a second request for the data associated with the first data identifier from a second requesting entity;
   maintaining mapping information for the second request that associates the first data identifier with the second requesting entity;
   determining that the first data identifier applies to the first request and to the second request;
   requesting the data associated with the first data identifier from a data-providing entity in a multiplexed request;
   receiving a response to the multiplexed request from the data-providing entity, the response including the data associated with the first data identifier;
   returning a first response to the first request, including accessing the mapping information to include the data associated with the first data identifier in the first response;
   returning a second response to the second request, including accessing the mapping information to include the data associated with the first data identifier in the second response;
   adding the first data identifier to a pending set, and wherein determining that the first data identifier applies to the first request and the second request comprises detecting the first data identifier in the pending set as being present in the second request; and
   determining that no other request needs a response that includes the data associated with the first data identifier, and removing the first data identifier from the pending set.

2. The method of claim 1 further comprising, receiving a third request for data associated with the first data identifier from a third requesting entity before removing the first data identifier from the pending set, and returning a third response to the third request that includes the data associated with the first data identifier in the third response.

3. The method of claim 1 wherein requesting the data associated with the first data identifier in the multiplexed request comprises including the multiplexed request as part of a batch request, and communicating the batch request to the data-providing entity.

4. The method of claim 3 wherein including the multiplexed request as part of the batch request comprises adding the multiplexed request to a batch buffer, and further comprising, adding the first data identifier to a pending set in conjunction with adding the multiplexed request to the batch buffer.

5. The method of claim 1 wherein the first request is part of a batch request from a client requesting entity, and further comprising, building a batch response that includes the data associated with the first data identifier and other data associated with at least one other identifier, and wherein returning the first response to the first request comprises returning the batch response.

6. The method of claim 1 further comprising, breaking the multiplexed request into a plurality of corresponding sub-requests, and reassembling responses to the plurality of corresponding sub-requests into a response to the request.

7. The method of claim 6 further comprising, multiplexing a sub-request with at least one other matching sub-request to obtain a single response to the multiplexed sub-request, and de-multiplexing the single response into sub-responses to the sub-request and to the at least one other matching sub-request.

8. The method of claim 6 further comprising, responding to at least one sub-request from data in a cache.

9. A system comprising:
    a request handling entity that receives requests for data items from requesting entities;
    a request manager of the request handling entity, the request manager including:
    a request multiplexer that that maintains a set of zero or more pending requests, and for each request for a data item, associates that data item request with its requesting entity in a map, and evaluates the set of pending data item requests to not request that data item more than once from a data-providing entity when another request for that data item is pending; and
    a request de-multiplexer that de-multiplexes responses from the data-providing entity, including for each data item received in each response, to access the map to re-associate that data item with each requesting entity that requested the data item for returning in a response to that requesting entity;
    wherein the request manager further comprises a batching process coupled to the request multiplexer, the batching process configured to combine a plurality of requests for data items from the request multiplexer into a batch request to the data-providing entity;
    wherein the request multiplexer considers another request for a data item to not be pending if an already pending request for that data item has been pending too long.

10. The system of claim 9 wherein the requesting entities comprise clients, wherein the request handling entity comprises a front-end data service, and wherein the data-providing entity comprises a back-end data service.

11. The system of claim 9 wherein the requesting entities comprise front-end data servers, wherein the request handling entity comprises a back-end data service, and wherein the data-providing entity comprises one or more backing data stores.

12. The system of claim 9 wherein a data item is requested as part of a batch request from a requesting entity.

13. One or more non-transitory machine-readable storage media having machine-executable instructions, which when executed perform steps, comprising:
    receiving a first request for a first data item from a first requestor;
    maintaining a mapping that associates the first requestor with the first request;
    determining for the first request whether another request for the first data item is already pending, and if not, adding an identifier of the first data item to a pending set and making a single request for the first data item to a data-providing entity, and if so, awaiting a response to the other request for the first data item;
    receiving a second request for the first data item from a second requestor;
    maintaining a mapping that associates the second requestor with the second request;
    determining for the second request that a request for the first data item is already pending, and awaiting a response to the other request for the first data item;
    receiving response data corresponding to the single request for the first data item;
    accessing the mapping to return the response data received for the first data item in a response to the first request from the first requestor;
    accessing the mapping to return the response data received for the first data item in a response to the second request from the second requestor; and
    determining that no other request needs a response that includes the data associated with the first data identifier, and removing the first data identifier from the pending set;
    wherein making the single request for the first data item comprises adding an identifier of the first data item to a batch request, and sending the batch request to the data-providing entity.

14. The non-transitory one or more machine-readable storage media of claim 13 having further machine-executable instructions comprising breaking the request for the first data item into a plurality of sub-requests.

* * * * *